US008371336B2

(12) United States Patent
Nakaoka et al.

(10) Patent No.: US 8,371,336 B2
(45) Date of Patent: Feb. 12, 2013

(54) ACCUMULATOR

(75) Inventors: Shinya Nakaoka, Fujisawa (JP); Kuniaki Miyake, Fujisawa (JP); Junichi Nakayama, Fujisawa (JP); Taisuke Yamada, Fujisawa (JP); Takeshi Watanabe, Fujisawa (JP); Tomonari Saito, Fujisawa (JP)

(73) Assignee: Eagle Industry Co., Ltd. (JP)

( * ) Notice: Subject to any disclaimer, the term of this patent is extended or adjusted under 35 U.S.C. 154(b) by 504 days.

(21) Appl. No.: 12/672,660

(22) PCT Filed: Sep. 16, 2008

(86) PCT No.: PCT/JP2008/066641

§ 371 (c)(1), (2), (4) Date: Feb. 8, 2010

(87) PCT Pub. No.: WO2009/047964

PCT Pub. Date: Apr. 16, 2009

(65) Prior Publication Data

US 2012/0006438 A1 Jan. 12, 2012

(30) Foreign Application Priority Data

Oct. 10, 2007 (JP) ................................ 2007-263947
Nov. 28, 2007 (JP) ................................ 2007-306776

(51) Int. Cl.
*F16L 55/04* (2006.01)

(52) U.S. Cl. ........................................ 138/30; 138/31

(58) Field of Classification Search .................... 138/30, 138/31

See application file for complete search history.

(56) References Cited

U.S. PATENT DOCUMENTS

| | | | | |
|---|---|---|---|---|
| 5,638,868 | A | 6/1997 | Loran | |
| 6,405,760 | B1 * | 6/2002 | Tranter et al. | 138/31 |
| 7,770,599 | B2 * | 8/2010 | Ota et al. | 138/31 |
| 7,810,522 | B1 * | 10/2010 | Nakaoka et al. | 138/31 |
| 8,096,324 | B2 * | 1/2012 | Nakaoka et al. | 138/31 |
| 2004/0017105 | A1 | 1/2004 | Suzuki et al. | |
| 2004/0250866 | A1 * | 12/2004 | Bartsch et al. | 138/30 |
| 2007/0102052 | A1 * | 5/2007 | Yoshihara et al. | 138/30 |

FOREIGN PATENT DOCUMENTS

| | | | |
|---|---|---|---|
| DE | 10304999 | A1 | 8/2004 |
| EP | 1382859 | A1 | 1/2004 |
| JP | H04-87001 | U | 7/1992 |
| JP | 2000-511996 | A | 9/2000 |
| JP | 2001-336502 | A | 12/2001 |
| JP | 2003-278702 | A | 10/2003 |

(Continued)

*Primary Examiner* — James Hook
(74) *Attorney, Agent, or Firm* — Harness, Dickey & Pierce, P.L.C.

(57) ABSTRACT

An outer gas type or inner gas type accumulator has a mechanism for reducing a pressure difference generated when liquid in a liquid chamber and gas expand thermally at a zero-down time, the pressure difference between the inside and outside of a bellows is reduced to suppress abnormal deformation of the bellows, a movable plate supported by a spring is provided at the bellows cap side of an oil port, the movable plate is supported by the spring and away from a seal in normal operation, the movable plate is pushed by the bellows cap and contacts with the seal while elastically deforming the spring, in a zero-down state, and when the liquid and the gas expand thermally in the zero-down state, the bellows cap moves to a position where the liquid pressure and the gas pressure balance, while the movable plate keeps contact with the seal.

4 Claims, 20 Drawing Sheets

FOREIGN PATENT DOCUMENTS

| | | | |
|---|---|---|---|
| JP | 2004-044740 | A | 2/2004 |
| JP | 2005-500487 | A | 1/2005 |
| JP | 2005-315429 | A | 11/2005 |
| JP | 2007-187229 | A | 7/2007 |
| WO | WO-97/46823 | A1 | 12/1997 |
| WO | WO-03/016774 | A | 2/2003 |

* cited by examiner

ACCUMULATOR

CROSS-REFERENCE TO RELATED APPLICATIONS

This is a national stage of the International Application No. PCT/JP2008/066641 filed on Sep. 16, 2008 and published in the Japanese language.

BACKGROUND OF THE INVENTION

1. Field of the Invention

The present invention relates to an accumulator used as a pressure accumulating apparatus or a pulse pressure damping apparatus or the like. The accumulator in accordance with the present invention is used, for example, in a hydraulic piping or the like in a vehicle such as a motor car or the like.

2. Description of the Conventional Art

Conventionally, there has been known an accumulator structured such that a bellows is arranged in an internal space of an accumulator housing provided with an oil port connected to a pressure piping so as to compart the internal space into a gas chamber sealing high pressure gas therein and a liquid chamber communicating with a port hole of the oil port. The accumulator includes a type that an inner peripheral side of a bellows 51 is set to a gas chamber 55 and an outer peripheral side thereof is set to a liquid chamber 56 by fixing the other end (a fixed end) 51*b* of the bellows 51, in which a bellows cap 52 is attached to one end (a floating end) 51*a*, to an end cover 54 in an upper portion of a housing 53, as shown in FIG. 18 (which is called as "inner gas type" since the gas chamber 55 is set in the inner peripheral side of the bellows 51, refer to patent document 1), and a type that the outer peripheral side of the bellows 51 is set to the gas chamber 55 and the inner peripheral side thereof is set to the liquid chamber 56 by fixing the other end (the fixed end) 51*b* of the bellows 51, in which the bellows cap 52 is attached to one end (the floating end) 51*a*, to an oil port 57 in a lower portion of the housing 53, as shown in FIG. 19 (which is called as "outer gas type" since the gas chamber 55 is set in the outer peripheral side of the bellows 51, refer to patent documents 2 or 3).

In this case, in the accumulator connected to the pressure piping of an equipment, if an operation of the equipment stops, liquid (oil) is discharged little by little from a port hole 58, and in the inner gas type accumulator in FIG. 18, the bellows 51 elongates little by little on the basis of sealed gas pressure in accordance with this, whereby the bellows cap 52 comes down little by little so as to come into contact with a seal 59, and comes to a so-called zero-down state. Further, in the outer gas type accumulator in FIG. 19, the bellows 51 contracts little by little on the basis of the sealed gas pressure in accordance with this, whereby the bellows cap 52 comes down little by little, and the seal 59 provided on a lower surface of the bellows cap 52 comes into contact with an opponent member 60 so as to come to a so-called zero-down state. Further, in this zero-down state, since a part of liquid is sealed in the liquid chamber 56 (a space between the bellows 51 and the seal 59) by a seal 59, and pressure of the sealed liquid is balanced with gas pressure in the gas chamber 55, it is possible to inhibit an excessive stress from being applied to the bellows 51 so as to cause an abnormal deformation.

However, in the case that the zero-down is caused by the operation stop at low temperature, and the temperature rises in this state, the liquid sealed in the liquid chamber 56 and the charged gas thermally expand respectively, and their pressures rise respectively. In this case, a rising rate of the pressure is higher in the liquid in comparison with the charged gas, however, since a pressure receiving area in the bellows cap 52 is set smaller in comparison with the charged gas, the bellows cap 52 does not move until the liquid pressure becomes considerably higher than the gas pressure. Accordingly, there is a case that a great pressure difference coming to about some MPa is generated between the liquid pressure and the gas pressure in the inner and outer sides of the bellows 51, and if the great pressure difference is generated as mentioned above, there is a risk that the bellows 51 is abnormally deformed, or the seal 59 is damaged.

Reference is made to Japanese Unexamined Patent Publication No. 2005-315429, Japanese Unexamined Patent Publication No. 2001-336502, and Japanese Unexamined Patent Publication No. 2007-187229.

Further, since an accumulator shown in FIG. 20 is the outer gas type accumulator similarly to the accumulator in FIG. 19, and further has such a peculiar structure that an auxiliary liquid chamber 71 is provided in an inner peripheral side of the bellows 51, and a piston 72 with a piston seal 73 is inserted into the auxiliary liquid chamber 71 so as to allow free stroke, the following disadvantages are pointed out (refer to patent document 4).

(i) The bellows 51 can be expanded only at a volumetric capacity of the auxiliary liquid chamber 71 (if the volumetric capacity of the auxiliary liquid chamber 71 is increased, the contraction of the bellows 51 is limited, and if the chamber 71 is made small, an amount of liquid for expanding the bellows 51 becomes small, and an amount of expansion can not be increased).

(ii) Since the stroke is done in a state in which the piston 72 is sealed by the piston seal 73, a slip resistance caused by a seal surface pressure is high, and a motion of the bellows 51 slows down at the loss amount (a function serving as the accumulator is lowered).

Reference is made to Japanese Unexamined Patent Publication No. 2003-278702.

Further, the following patent document 5 discloses an accumulator structured such that a secondary piston is coupled to a bellows cap via a secondary bellows, however, the following disadvantage is pointed out in this conventional art.

(iii) Since the contraction of the bellows is done in a state in which the secondary bellows expands at a time of the zero-down, and the contraction of the bellows stops at the stage that the secondary piston reaches the lowest surface, it is impossible to secure a sufficient expanding stroke of the bellows.

Reference is made to Japanese National Publication of Translated Version No. 2005-500487.

SUMMARY OF THE INVENTION

Problem to be Solved by the Invention

The present invention is made by taking the points mentioned above into consideration, and an object of the present invention is to provide an outer gas or inner gas type accumulator provided with a mechanism for lowering a pressure difference generated when liquid sealed in a liquid chamber and charged gas thermally expand at a time of zero-down, where it is possible to inhibit the bellows from being abnormally deformed, by lowering the pressure difference between the inner and outer sides of the bellows.

Means for Solving the Problem

In order to achieve the object mentioned above, in accordance with a first aspect of the present invention, there is provided an accumulator comprising:

an accumulator housing provided with an oil port connected to a pressure piping;

a bellows and a bellows cap arranged in an internal space of the housing and comparting the internal space into a gas chamber charging high pressure gas and a liquid chamber communicating with a port hole of the oil port; and a seal closing the liquid chamber at a time of zero-down so as to seal a part of liquid in the liquid chamber, the seal being provided in an inner side of the oil port, wherein a movable plate supported by a spring means is provided at the bellows cap side of the oil port, the movable plate is supported by the spring means so as to stay away from the seal at a time of a stationary operation, the movable plate is pushed by the bellows cap so as to come into contact with the seal while elastically deforming the spring means at a time of the zero-down, and the bellows cap moves to a position at which liquid pressure is balanced with gas pressure while the movable plate keeps in contact with the seal, when the liquid sealed in the liquid chamber and the charged gas thermally expand at a time of the zero-down.

Further, in accordance with a second aspect of the present invention, there is provided an accumulator as recited in claim 1, wherein the spring means is constructed by a coil spring, the coil spring is interposed between the oil port and the movable plate, and the oil port is provided with a stopper defining a maximum clearance of the movable plate.

Further, in accordance with a third aspect of the present invention, there is provided an accumulator as recited in the first aspect, wherein the spring means is constructed by a leaf spring, and the leaf spring is arranged at an outer peripheral side of the movable plate, is fixed to the oil port by its one end portion, and is fixed to the movable plate by its other end portion.

Further, in accordance with the fourth aspect of the present invention, there is provided an accumulator as recited in the first aspect, wherein the spring means is constructed by both a coil spring and a leaf spring, the coil spring is interposed between the oil port and the movable plate, and the leaf spring is arranged at an outer peripheral side of the movable plate, is fixed to the oil port by its one end portion, and is fixed to the movable plate by its other end portion.

The accumulator in accordance with the present invention having the structure mentioned above operates as follows.

Stationary operating time:

Since the movable plate provided at the bellows cap side of the oil port is supported by the spring means so as to stand away from the seal, the port hole communicates with the liquid chamber (the space between the bellows and the seal). Accordingly, since the liquid having occasional pressure is introduced from the port hole to the liquid chamber at any time, the bellows cap moves in such a manner that liquid pressure balances with gas pressure. As a specific example of the spring means supporting the movable plate, the coil spring or the leaf spring (a thin disc) is preferable, and both may be used together.

Zero-down time:

When the operation of an equipment stops, the liquid within the liquid chamber is discharged from the port hole little by little, the bellows contracts (in the case of the outer gas type) or expands (in the case of the inner gas type) due to the charged gas in accordance with this, and the bellows cap moves in the bellows contracting direction or the bellows expanding direction. The moving bellows cap presses the movable plate, and moves the movable plate, while elastically deforming the spring means, so as to bring the movable plate into contact with the seal. When the movable plate comes into contact with the seal, the liquid chamber (the space between the bellows and the seal) is closed, and a part of the liquid is sealed in the liquid chamber. Accordingly, no further pressure reduction is caused, whereby the liquid pressure balances with the gas pressure at the inner and outer sides of the bellows. In this case, since the movable plate comes into contact with the seal, but the bellows cap does not come into contact with the seal, the pressure receiving area of the bellows cap is not limited by the seal. Accordingly, the pressure receiving area of the bellows cap is set equally between one surface at the gas chamber side and the opposite surface at the liquid chamber side.

Thermally expanding time in zero-down state:

If the liquid sealed in the liquid chamber and the charged gas are thermally expanded on the basis of a rise of ambient air temperature or the like in the zero-down state, that is, in a state in which the movable plate comes into contact with the seal, a pressure difference is generated since a rising rate of pressure is higher in the liquid than in the gas. In this case, since the pressure receiving area of the bellows cap is set equally between the gas chamber side and the liquid chamber side as mentioned above, in the present invention, the bellows cap immediately moves so as to lower the pressure difference, upon the generation of the pressure difference. Accordingly, since a great pressure difference is inhibited from being generated between the inner and outer sides of the bellows, it is possible to prevent abnormal deformation from being caused in the bellows on the basis of the pressure difference. In this case, since the movable plate is exposed to the limitation of the pressure receiving area caused by the seal in place of the conventional bellows cap, at a time of the thermal expanding operation, the movable plate does not come away (does not move) while keeping in contact with the seal. Accordingly, only the bellows cap moves. The movable plate is returned on the basis of a change of the pressure receiving area, an elasticity of the spring means or the like, when the zero-down is dissolved, and stays away from the seal.

Effect of the Invention

Therefore, in accordance with the accumulator of the present invention operating as mentioned above, since it is possible to reduce the pressure difference generated when the liquid sealed in the liquid chamber and the charged gas thermally expand at a time of the zero-down, in the outer gas type or inner gas type accumulator, it is possible to reduce the pressure difference between the inner and outer sides of the bellows, and it is possible to prevent the bellows from being abnormally deformed. Accordingly, it is possible to improve durability of the bellows and, consequently, that of the accumulator. Further, since the auxiliary liquid chamber and the secondary bellows are not provided, it is possible to dissolve the disadvantages (i), (ii) and (iii) mentioned above.

DETAILED DESCRIPTION OF PREFERRED EMBODIMENT

Figure 1:
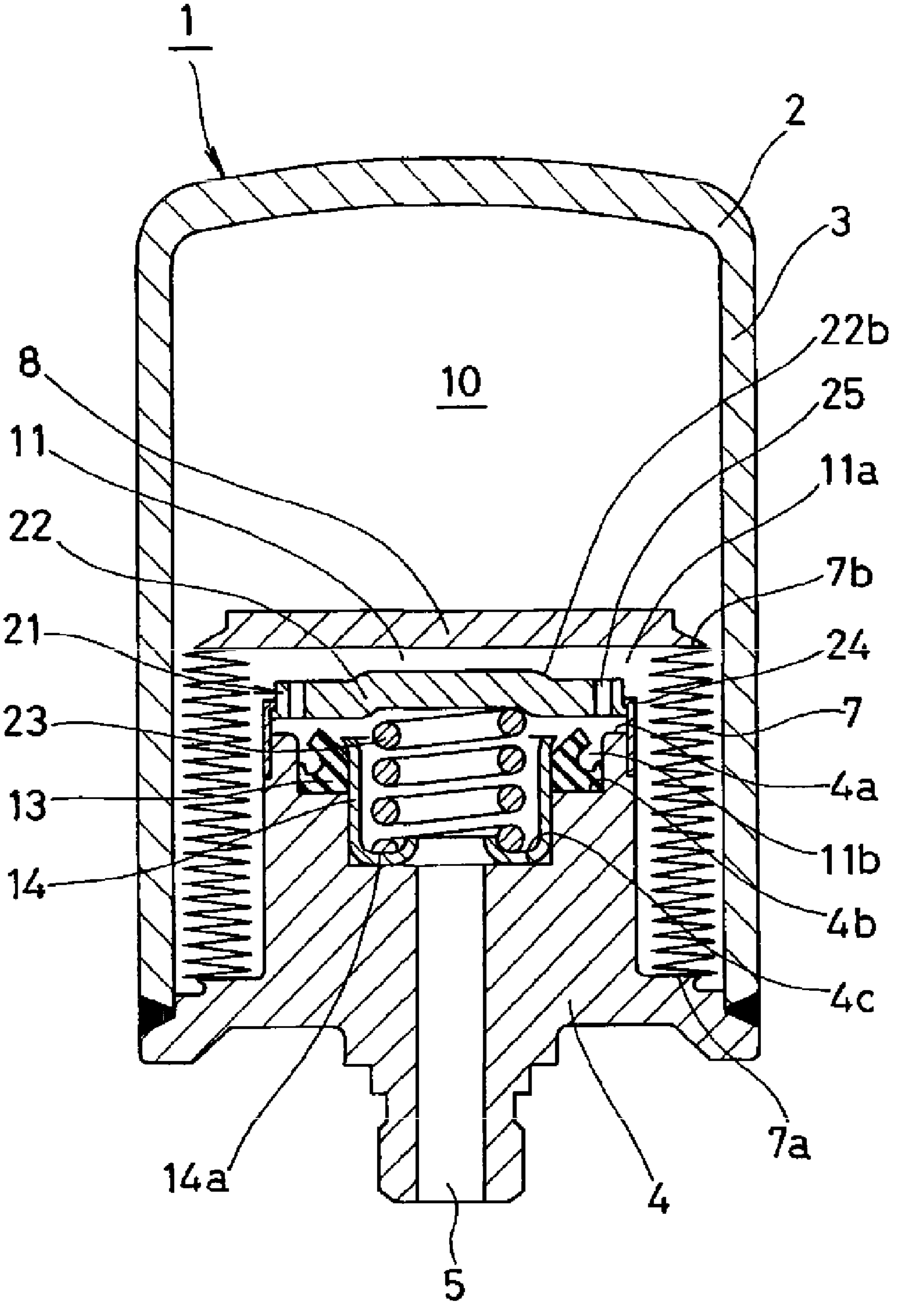
FIG. 1 is a whole sectional view showing a state at a stationary operating time of an accumulator in accordance with a first embodiment of the present invention.

The following modes are included in the present invention.

(1-1) High pressure gas is charged in an outer portion of a bellows, and liquid is flowed in and out from a port hole to an inner portion of the bellows. A disc (a movable plate) supported by a coil spring is provided at a bellows cap side of an oil port. The disc comes into contact with a seal provided in the oil port at a time of zero-down so as to prevent the liquid in the inner portion of the bellows from flowing out.

(1-2) The disc is fixed to the oil port in a state in which the disc is supported to the coil spring, rises up from the oil port when the liquid pressure is applied, and does not come into contact with the seal provided in the oil port. On the basis of sealing by the disc at a time of the zero-down, the pressure receiving areas on the bellows cap are equal between the gas pressure and the liquid pressure in the inner portion of the bellows. In the case that the liquid in the inner portion of the bellows thermally expands, the bellows cap can move to a position at which the gas pressure is balanced with the liquid pressure, in a state in which the disc is kept being pressed to the oil port. Accordingly, a difference of pressure is not generated between the inner and outer sides of the bellows, and the deformation of the bellows is not caused.

(2-1) The high pressure gas is charged into the external portion of the bellows, and the liquid is flowed in and out from the port hole to the internal portion of the bellows. The disc (the movable plate) supported by the thin disc (the leaf spring) is provided at the bellows cap side of the oil port. The disc comes into contact with the seal provided in the oil port at a time of the zero-down so as to prevent the liquid in the internal portion of the bellows from flowing out.

(2-2) The disc coming into contact with the seal is bonded to the thin disc bonded to the outer peripheral portion of the oil port, rises up from the oil port in a state (a normal operating state) in which the liquid pressure is applied, and does not come into contact with the seal provided in the oil port. At a time of the zero-down, the disc is pushed down by the bellows cap, and comes into contact with the seal so as to come to a state in which it is pressed to the oil port. In the case that the liquid in the internal portion of the bellows thermally expands in the zero-down state, the bellows cap rises so as to absorb a volume expansion of the liquid while the disc keeps in contact with the seal. Accordingly, no excessive deformation of the bellows is caused. The thin disc has the leaf spring portion in such a manner as to be easily deformed.

(3-1) The high pressure gas is charged into the external portion of the bellows, and the liquid is flowed in and out from the port hole to the inner side of the bellows. The disc (the movable plate) supported by the coil spring is provided at the bellows cap side of the oil port. The disc comes into contact with the seal provided in the oil port at a time of the zero-down so as to prevent the liquid in the internal portion of the bellows from flowing out. The disc is bonded to the oil port by the thin disc (the leaf spring) for operating in a predetermined range.

(3-2) The disc coming into contact with the seal is supported by the thin disc bonded to the outer peripheral portion of the oil port and the coil spring in the inner peripheral portion of the oil port. In the state (the normal operating state) in which the liquid pressure is applied, the disc sufficiently rises up from the oil port on the basis of the reaction force of the coil spring, and does not come into contact with the seal provided in the oil port. Further, the movement in the radial direction is constrained by the thin disc in such a manner as to prevent the disc from coming into contact with the outer peripheral portion of the oil port at the normal operating time. The disc is pushed down by the bellows cap at a time of the zero-down, and comes into contact with the seal so as to come to a state in which the disc is pressed to the oil port. In the case that the liquid in the internal portion of the bellows thermally expands in this zero-down state, the bellows cap rises so as to absorb the volume expansion of the liquid while the disc keeps in contact with the seal. Accordingly, no excessive deformation of the bellows is caused. The thin disc has the leaf spring portion in such a manner as to be easily deformed.

(4-1) The high pressure gas is charged into the internal portion of the bellows, and the liquid is flowed in and out from the port hole to the outer side of the bellows. The disc (the movable plate) supported by one or both of the coil spring and the thin disc (the leaf spring) is provided at the bellows cap side of the oil port. The disc comes into contact with the seal provided in the oil port at a time of the zero-down so as to prevent the liquid in the internal portion of the bellows from flowing out.

(4-2) The disc coming into contact with the seal is supported by the thin disc bonded to the outer peripheral portion of the oil port and the coil spring in the inner peripheral portion of the oil port. In this case, the disc is supported by both or one of the coil spring and the thin disc. In the state (the normal operating state) in which the liquid pressure is applied, the disc sufficiently rises up from the oil port on the basis of the reaction force of the coil spring or/and a neutral position of the thin disc, and does not come into contact with the seal provided in the oil port. Further, the movement in the radial direction is constrained by the thin disc in such a manner as to prevent the disc from coming into contact with the outer peripheral portion of the oil port at the normal operating time. The disc is pushed down by the bellows cap at a time of the zero-down, and comes into contact with the seal so as to come to a state in which the disc is pressed to the oil port. In the case that the liquid in the internal portion of the bellows thermally expands in this zero-down state, the bellows cap rises so as to absorb the volume expansion of the liquid while the disc keeps in contact with the seal. Accordingly, no excessive deformation of the bellows is caused. The thin disc has the leaf spring portion in such a manner as to be easily deformed.

Embodiments

Next, a description will be given of embodiments in accordance with the present invention with reference to the accompanying drawings.

First Embodiment

Figure 2:
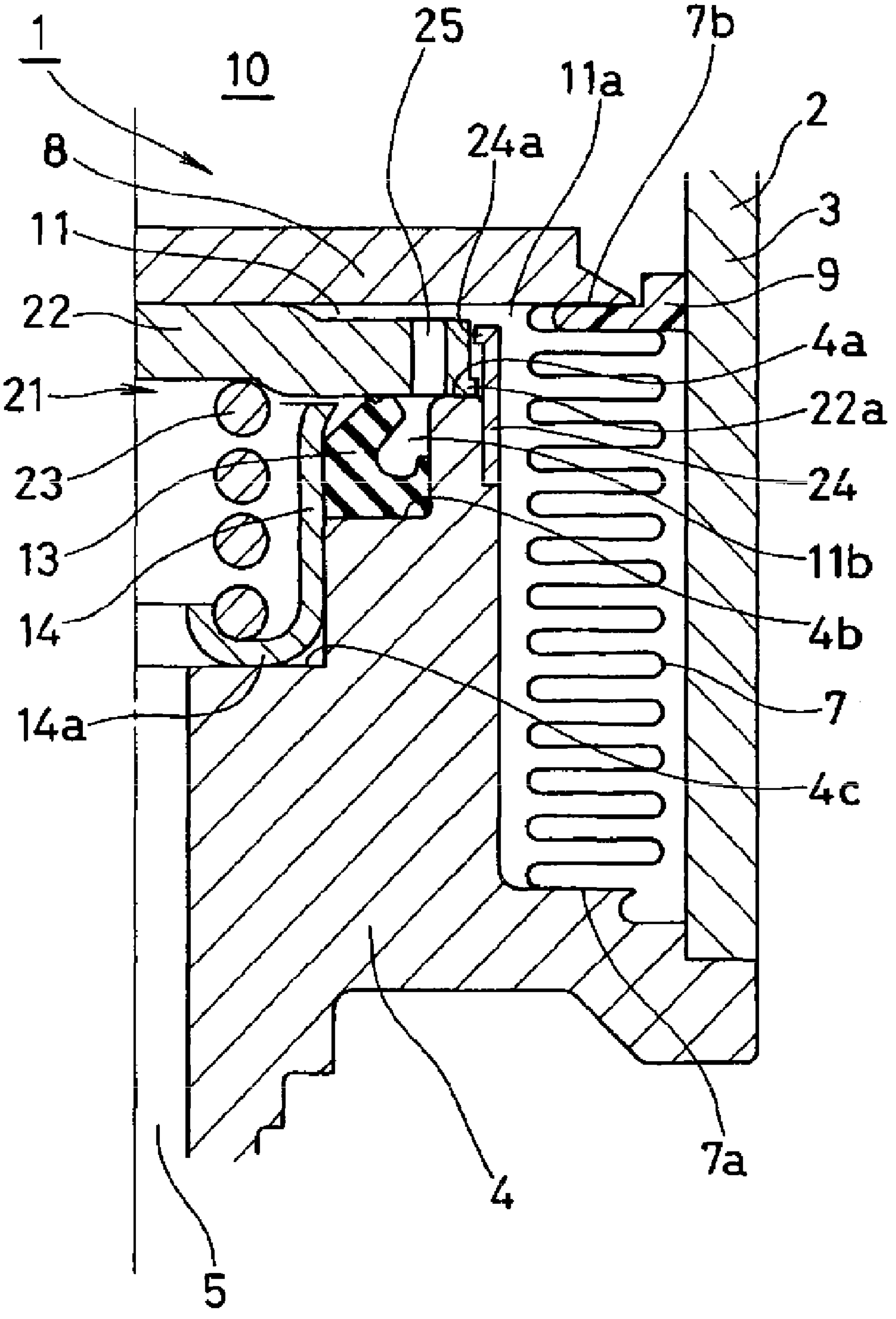
FIG. 2 is a substantial part sectional view showing a state at a time of a zero-down of the accumulator.
Figure 3:
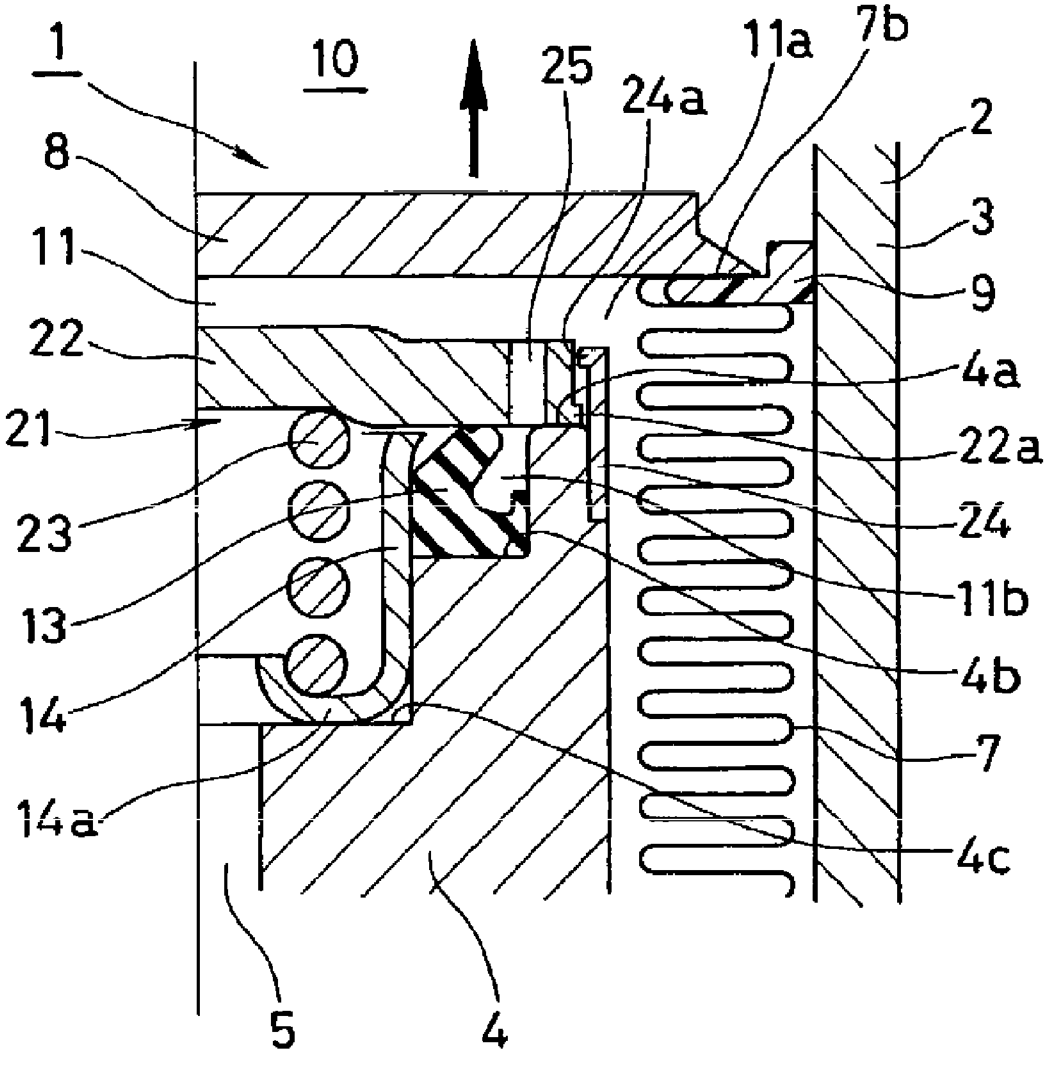
FIG. 3 is a substantial part sectional view showing a state at a thermal expanding time in the zero-down state of the accumulator.

FIGS. 1 to 3 show a whole section or a partial section of an accumulator 1 in accordance with a first embodiment of the present invention. FIG. 1 shows a state at a stationary operating time, FIG. 2 shows a state at a zero-down time, and FIG. 3 shows a state at a thermally expanding time in the zero-down state, respectively.

The accumulator 1 in accordance with the embodiment is a metal bellows type accumulator using a metal bellows as a bellows 7, and is constructed as follows.

First of all, there is provided an accumulator housing 2 having an oil port 4 connected to a pressure piping (not shown), a bellows 7 is arranged in an inner portion of the housing 2, and an internal space of the housing 2 is comparted into a gas chamber 10 in which high pressure gas is charged, and a liquid chamber 11 which communicates with a port hole 5 of the oil port 4. As the housing 2, there is drawn a housing constructed by a combination of a closed-end cylindrical shell 3, and the oil port 4 fixed to one end opening portion of the shell 3, however, a component combining structure of the housing 2 is not limited particularly. For example, the shell 3 and the oil port 4 may be integrated, a bottom portion of the shell 3 may be constructed by an end cover which is an independent body from the shell 3, and in any case, a gas injection port (not shown) for injecting gas into the gas chamber 10 is provided in the bottom portion of the shell 3 or a corresponding part thereto.

The bellows 7 is structured such that a fixed end 7*a* thereof is fixed to an inner surface of a flange portion of the oil port 4 corresponding to a port side inner surface of the housing 2 and a disc-shaped bellows cap 8 is fixed to a floating end 7*b* thereof, whereby the accumulator 1 is constructed as an outer gas type accumulator in which the gas chamber 10 is arranged in an outer peripheral side of the bellows 7 and the liquid chamber 11 is arranged in an inner peripheral side of the bellows 7. Further, as shown in FIG. 2, a damping ring 9 is attached to an outer peripheral portion of the floating end 7*b*, for preventing the bellows 7 and the bellows cap 8 from coming into contact with the inner surface of the housing 2.

Annular first and second step portions 4*b* and 4*c* are sequentially formed in an inner side of the port hole 5, that is, an inner surface (a top surface in the drawing) of the oil port 4 so as to be positioned at an inner peripheral side of an annular stopper projection (seat surface) 4*a*, and a seal 13 is fitted and attached to the first step portion 4*b* and is held by a seal holder 14 fitted and attached to the second step portion 4*c* so as to be prevented from coming off. The seal 13 is structured such as to close the liquid chamber 11 (a space between the bellows 7 and the seal 13) at a time of zero-down of the accumulator 1 so as to seal a part of liquid in the liquid chamber 11, and is formed by a rubber-like elastic body packing provided with an outward seal lip in such a manner as to sufficiently achieve this function. In this case, the seal 13 may employ an O-ring, an X-ring or the like as far as a sufficient sealing performance can be obtained, and the present invention does not particularly limit a shape of the seal 13.

Further, the accumulator 1 is provided with a pressure difference regulating mechanism 21 reducing a pressure difference generated when each of the liquid sealed in the liquid chamber 11 and the charged gas thermally expands at a time of the zero-down.

The pressure difference regulating mechanism 21 has a movable plate 22 supported by a spring means 23, at the bellows cap 8 side of the oil port 4, in addition to the bellows 7 and the bellows cap 8. Further, a stopper 24 defining a stroke limit (a maximum clearance) in a direction in which the movable plate 22 stays away from the seal 13 is attached to an outer peripheral portion of the oil port 4. Further, the movable plate 22 is provided with a communication path 25 for communicating between a space (hereinafter, refer to as a bellows inner peripheral space) 11*a* surrounded by the bellows 7, the oil port 4, the stopper 24, the movable plate 22 and the bellows cap 8, and the port hole 5 at a stationary operating time. The stopper 24 may be formed integrally with the oil port 4.

The movable plate 22 is constructed by a disc made of a rigid material such as a metal or the like, and is arranged so as to allow free stroke in an axial direction (a vertical direction in the drawing) in such a manner as to come into contact with and away from the seal 13. One end limit (a lower end limit) of the stroke is defined by the movable plate 22 coming into contact with the stopper projection 4*a*. Since a lip end of the seal 13 somewhat protrudes from the level of the stopper projection 4*a*, the movable plate 22 has been already in contact with the seal 13 at a time point when the movable plate 22 comes into contact with the stopper projection 4*a*. Further, the other end limit (an upper end limit) of the stroke is defined by a projection-shaped engagement portion 22*a* (FIG. 2) provided on an outer peripheral portion of the movable plate 22 engaging with a hook-shaped engagement portion 24*a* (FIG. 2) provided on a stopper 24. The stopper 24 is structured by integrally forming a hook-shaped engagement portion 24*a* on one end of a tubular body fixed to the oil port 4, and the other end limit of the stroke of the movable plate 22 is defined and the movable plate 22 is prevented from coming off, by engaging with the stopper 24.

The spring means 23 is constructed by a coil spring, is interposed between a spring retainer 14*a* and the movable plate 22 where a lower end flange portion of the seal holder 14 is set as the spring retainer 14*a*, and elastically energizes the movable plate 22 in a direction of staying away from the seal 13 (an upward direction in the drawing). However, since a function of the spring means 23 is to move the movable plate 22 away from the seal 13 at the stationary operating time, it is not necessary to energize the movable plate 22 when the movable plate 22 is positioned at the other end limit of the stroke, and it is sufficient to support the movable plate 22.

Further, in the case that one end (a lower end) of the spring means 23 is connected (coupled or bonded) to the oil port 4, and the other end (an upper end) is connected (coupled or bonded) to the movable plate 22, the spring means 23 holds the movable plate 22 in a floating manner at a position which stays away from the stopper projection 4*a* and the seal 13. Accordingly, the spring means 23 has a function of defining the stroke other end limit of the movable plate 22 together. Accordingly, in this case, since the spring means 23 acts as a stopper, the stopper 24 as an independent part can be omitted. Further, if the stopper 24 is omitted, an installed space is set to a communication path for communicating between the port hole 5 and the bellows inner peripheral space 11*a* of the liquid chamber 11. Accordingly, it is not necessary to provide a through hole or a notch serving as a communication path 25 in the movable plate 22 as mentioned below.

The communication path 25 is constructed by a through hole or a notch (a through hole in the drawing) which is formed in a thickness direction in an outer peripheral portion of the movable plate 22, and a plurality of through holes or notches are provided side by side so as to be spaced at a predetermined interval in a circumferential direction of the movable plate 22. A formed position of the through hole or the like is set at an inner side in a radial direction than a position coming into contact with the stopper projection 4*a* and at an outer side in a radial direction than a position coming into contact with a lip end of the seal 13. Further, the communication path 25 can be considered to be provided in the stopper 24 in place of the movable plate 22 (in the case that the engagement portion 24*a* of the stopper 24 extends all over a whole periphery, the through hole or the notch is provided in the movable plate 22 so as to set the through hole or the notch to the communication path 25. On the contrary, in the case that the engagement portion 24*a* of the stopper 24 is partial in the circumferential direction, an opening between the engagement portions 24*a* which are adjacent to each other acts as the communication path 25. Accordingly, it is not necessary to provide any through hole or notch in the movable plate 22).

Since the fixed end 7*a* of the bellows 7 is fixed to the inner surface of the flange portion of the oil port 4 corresponding to the port side inner surface of the housing 2, the accumulator 1 having the structure mentioned above belongs to the outer gas type category, and operates as follows on the basis of the structure mentioned above.

Stationary operating time:

FIG. 1 shows a state at the stationary operating time of the accumulator 1. The oil port 4 is connected to a pressure piping of an equipment (not shown). In this stationary state, since the movable plate 22 is supported by the spring means 23 and stays away from the seal 13, the port hole 5 communicates with the bellows inner peripheral space 11*a* via the communication path 25. Accordingly, since liquid having occasional pressure is introduced from the port hole 5 to the bellows inner peripheral space 11*a*, the bellows cap 8 moves in such a manner that the liquid pressure balances with the gas pressure while expanding and contracting the bellows 7.

Zero-down time:

When the operation of the equipment stops from the state in FIG. 1, the liquid within the liquid chamber 11 is discharged little by little from the port hole 5, the bellows 7 is contracted little by little on the basis of the charged gas pressure in accordance with this, and the bellows cap 8 is moved little by little in the bellows contracting direction (a downward direction in the drawing). The moving bellows cap 8 presses the movable plate 22, and moves the movable plate 22, while compressing the spring means 23, so as to bring the movable plate 22 into contact with the seal 13. As shown in FIG. 2, the movable plate 22 stops by coming into contact with the stopper projection 4*a*. When the movable plate 22 comes into contact with the seal 13 and the stopper projection 4*a*, the liquid chamber (the space between the bellows 7 and the seal 13) 11 is closed and a part of liquid is sealed in the liquid chamber 11. Accordingly, any further pressure reduction is not caused in the liquid chamber 11, whereby the liquid pressure balances with the gas pressure at the inner and outer sides of the bellows 7. Therefore, it is possible to suppress the abnormal deformation of the bellows 7 on the basis of the zero-down. In this case, since the movable plate 22 comes into contact with the seal 13 but the bellows cap 8 does not come into contact with the seal 13 at the zero-down time, the pressure receiving area of the bellows cap 8 is not limited by the seal 13 as is different from the conventional art mentioned above. Accordingly, the pressure receiving area of the bellows cap 8 is set equally between one surface at the gas chamber 10 side and the opposite surface at the liquid chamber 11 side.

Thermally expanding time in zero-down state:

When each of the liquid sealed in the liquid chamber 11 and the charged gas is thermally expanded on the basis of ambient air temperature rise or the like in the zero-down state in FIG. 2, that is, in the state in which the movable plate 22 comes into contact with the seal 13 and the stopper projection 4*a*, a pressure difference is generated since a rising rate of the pressure is higher in the liquid than in the gas. However, since the pressure receiving area of the bellows cap 8 is set equally between the gas chamber 10 side and the liquid chamber 11 side in the accumulator 1, the bellows cap 8 immediately starts moving in a direction that the bellows cap 8 stays away from the movable plate 22 (an upward direction in the drawing) as shown in FIG. 3, when the pressure difference is generated, and stops at a position at which the liquid pressure balances with the gas pressure. Accordingly, since it is possible to inhibit a great pressure difference from being generated between the inner and outer sides of the bellows 7, it is possible to prevent abnormal deformation from being caused in the bellows 7 on the basis of the pressure difference. At this time, since the movable plate 22 keeps being in contact with the seal 13 as illustrated on the basis of the difference of the pressure receiving area between both the upper and lower faces, the zero-down state is not dissolved.

Therefore, in accordance with the accumulator 1 mentioned above, since it is possible to reduced the pressure difference generated when each of the liquid sealed in the liquid chamber 11 and the charged gas is thermally expanded at the zero-down time, in the outer gas type accumulator, it is possible to reduce the pressure difference between the inner and outer sides of the bellows 7, and it is possible to prevent the abnormal deformation from being caused in the bellows 7. Therefore, it is possible to improve durability of the bellows 7 and, consequently, that of the accumulator 1.

Further, in the zero-down state in FIG. 2, the through hole provided in the movable plate 22 has a function of communicating between the space 11*b* surrounded by the stopper projection 4*a*, the seal 13 and the movable plate 22, and the bellows inner peripheral space 11*a*, thereby inhibiting the liquid in the former space 11*b* from becoming high pressure on the basis of the thermal expansion. Accordingly, it is possible to prevent the seal 13 from being damaged by the high pressure of the space 11*b*.

In this case, in the zero-down state in FIG. 2, the bellows cap 8 and the movable plate 22 come into contact with each other, however, it is preferable to apply the liquid pressure as quick as possible to the lower surface of the bellows cap 8, at the expanding time of the liquid and the charged gas. Accordingly, it is preferable that a spacer portion such as a step, a projection or the like is provided on a lower surface of the bellows cap 8 or an upper surface of the movable plate 22 in such a manner that the pressure quickly reaches a portion between the both 8 and 22. From this point of view, an inside higher step-shaped convex portion 22*b* (refer to FIG. 1) is provided on the upper surface of the movable plate 22, in the embodiment mentioned above.

Second Embodiment

Figure 4:
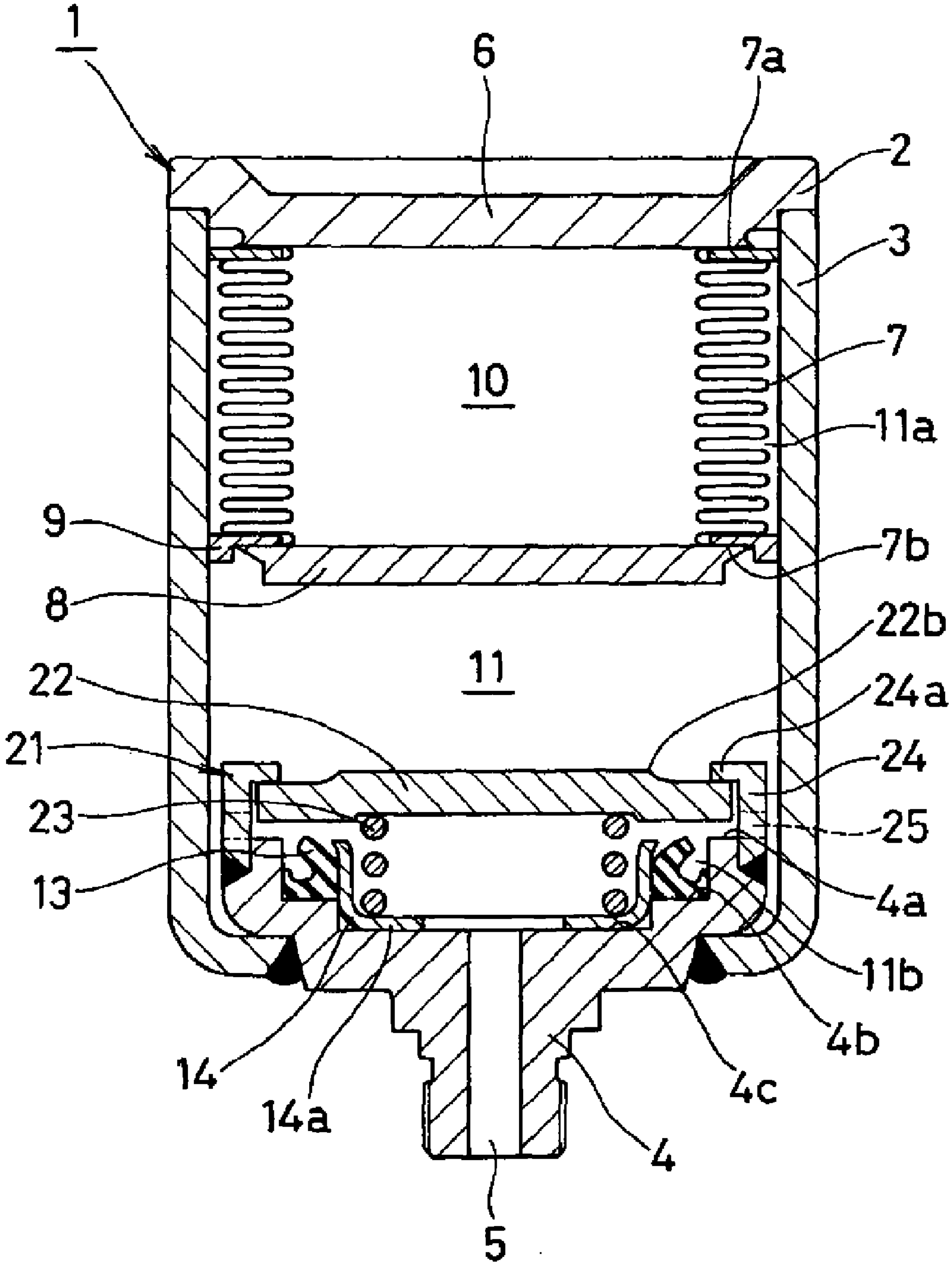
FIG. 4 is a whole sectional view showing a state at a stationary operating time of an accumulator in accordance with a second embodiment of the present invention.

The accumulator 1 in accordance with the first embodiment mentioned above is the outer gas type accumulator, however, the pressure difference regulating mechanism 21 can be applied to an inner gas type accumulator. FIG. 4 shows an embodiment thereof, and a fixed end 7*a* of a bellows 7, in which a bellows cap 8 is attached to a floating end 7*b*, is fixed to an end cover 6 in an upper portion of a housing 2, whereby the inner gas type accumulator 1 is constructed so that an inner peripheral side of the bellows 7 is set to a gas chamber 10, and an outer peripheral side thereof is set to a liquid chamber 11. Since the structure and the operation of the pressure difference regulating mechanism 21 are the same as those of the first embodiment, a description thereof will be omitted by attaching the same reference numerals. However, as a different point, a communication path 25 is provided as a horizontal hole shaped structure in a rising portion (a tubular portion) of a stopper 24.

Third Embodiment

Figure 5:
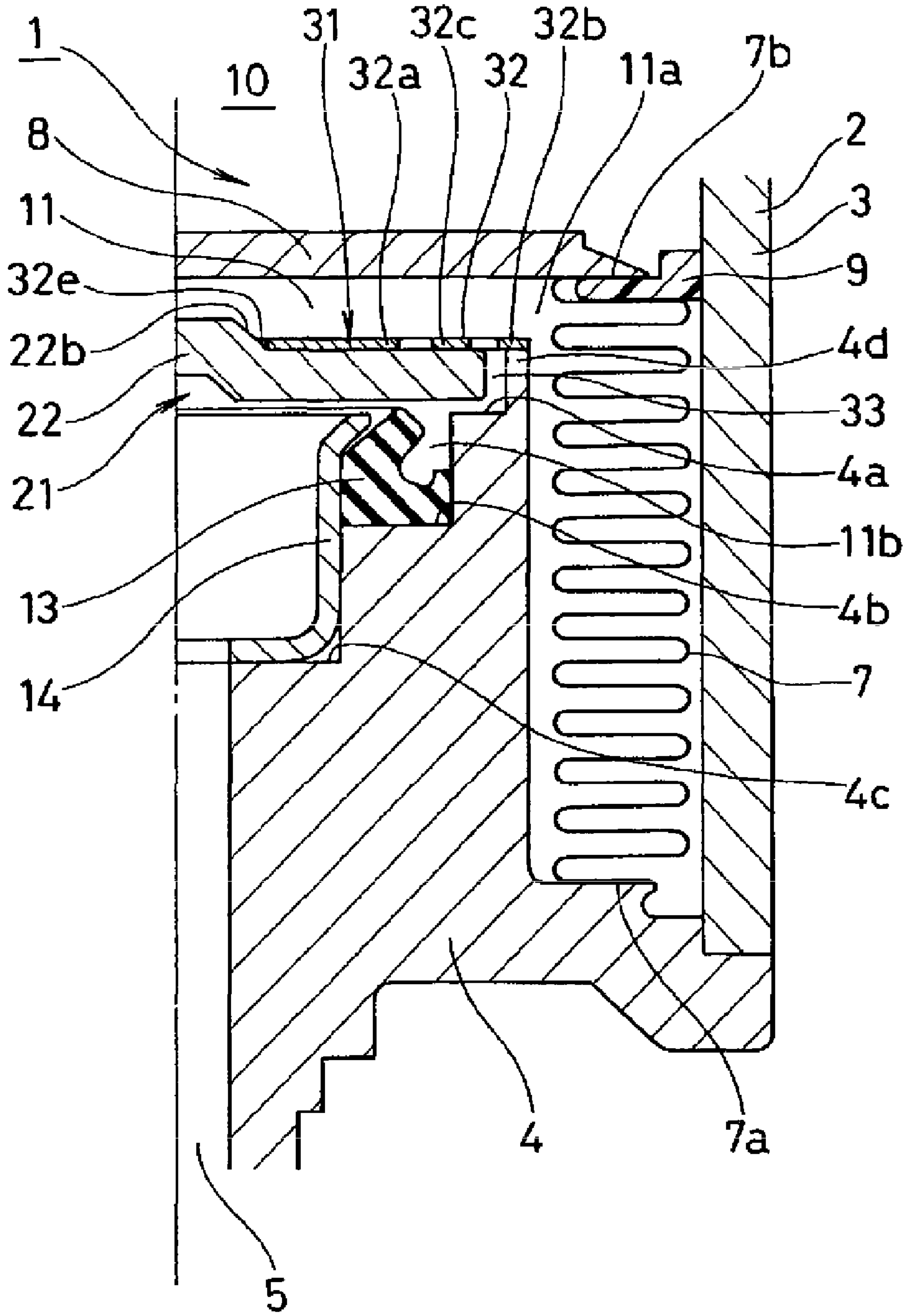
FIG. 5 is a substantial part sectional view showing a state at a stationary operating time of an accumulator in accordance with a third embodiment of the present invention.
Figure 6:
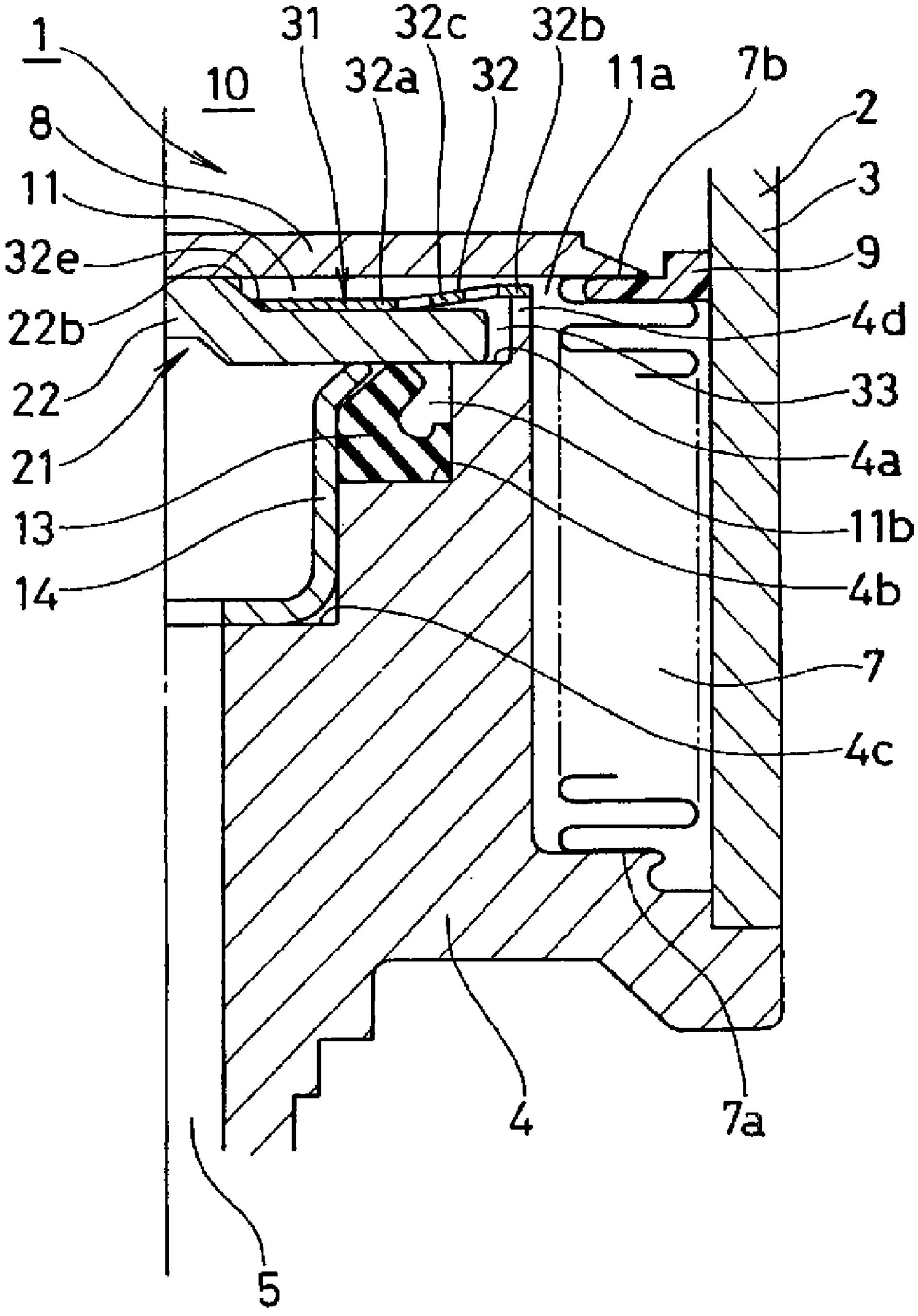
FIG. 6 is a substantial part sectional view showing a state at a time of zero-down of the accumulator.
Figure 7:
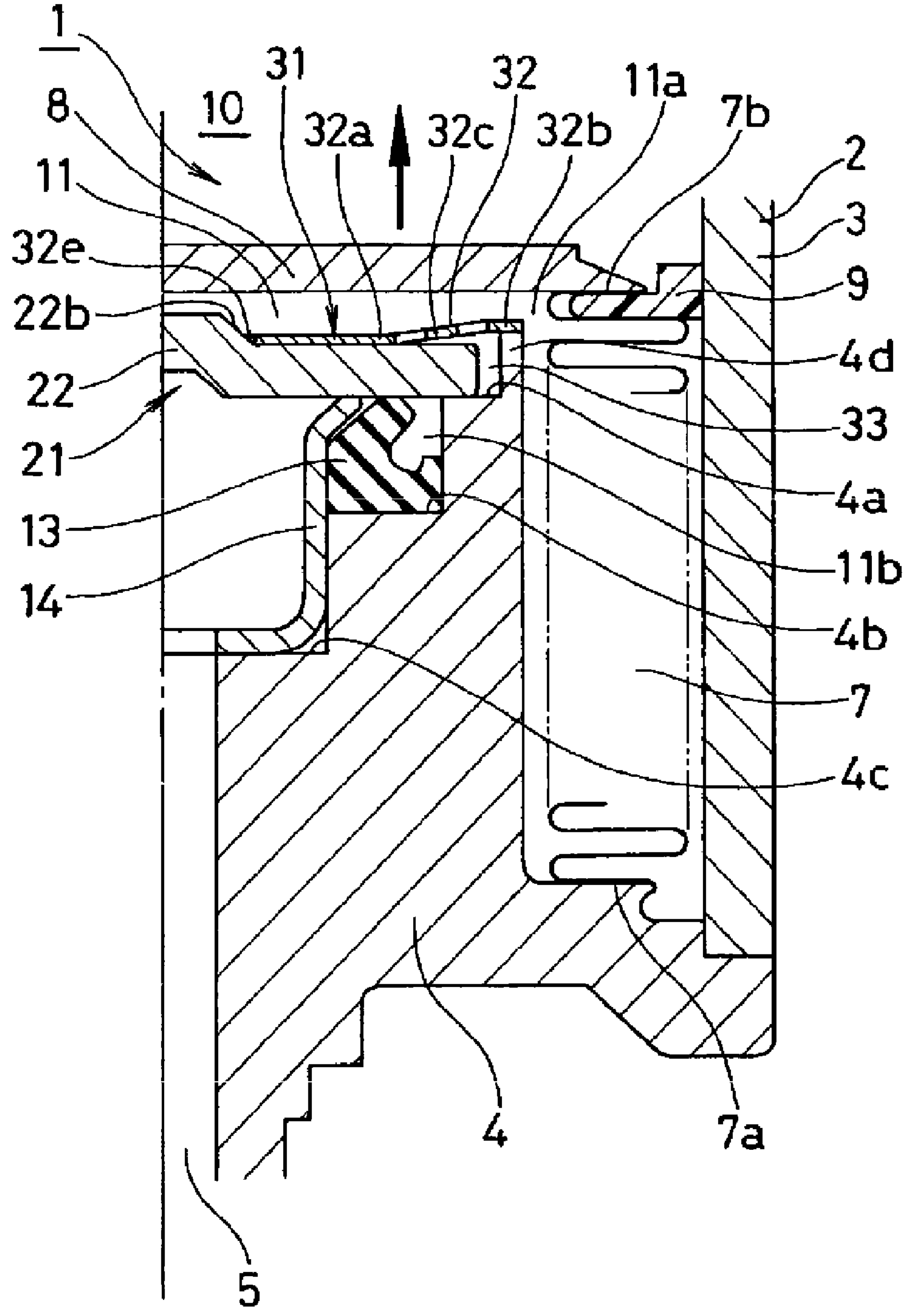
FIG. 7 is a substantial part sectional view showing a state at a thermal expanding time in the zero-down state of the accumulator.
Figure 8:
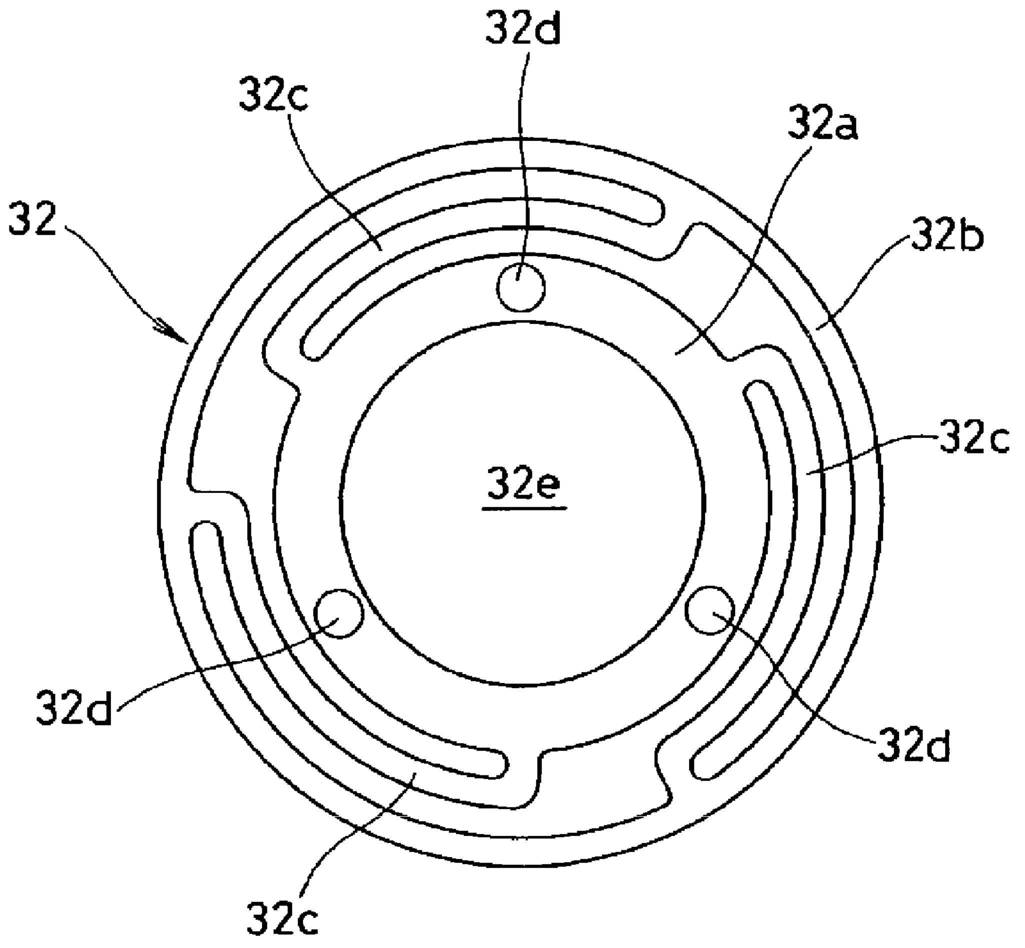
FIG. 8 is a plan view of a leaf spring (a thin disc) in the accumulator.

FIGS. 5 to 7 show a partial section of an accumulator 1 in accordance with a third embodiment of the present invention. FIG. 5 show a state at a stationary operating time, FIG. 6 shows a state at a zero-down time, and FIG. 7 shows a state at a thermally expanding time in the zero-down state, respectively. Further, FIG. 8 is a plan view of a thin disc 32 serving as a spring means 31.

The accumulator 1 in accordance with the embodiment is a metal bellows type accumulator using a metal bellows as a bellows 7, and is constructed as follows.

First of all, there is provided an accumulator housing 2 having an oil port 4 connected to a pressure piping (not shown), a bellows 7 is arranged in an inner portion of the housing 2, and an internal space of the housing 2 is comparted into a gas chamber 10 in which high pressure gas is charged, and a liquid chamber 11 which communicates with a port hole 5 of the oil port 4. As the housing 2, there is drawn a housing constructed by a combination of a closed-end cylindrical shell 3, and the oil port 4 fixed to one end opening portion of the shell 3, however, a component combining structure of the housing 2 is not limited particularly. For example, the shell 3 and the oil port 4 may be integrated, a bottom portion of the shell 3 may be constructed by an end cover which is an independent body from the shell 3, and in any case, a gas injection port (not shown) for injecting gas into the gas chamber 10 is provided in the bottom portion of the shell 3 or a corresponding part thereto.

The bellows 7 is structured such that a fixed end 7*a* thereof is fixed to an inner surface of a flange portion of the oil port 4 corresponding to a port side inner surface of the housing 2 and a disc-shaped bellows cap 8 is fixed to a floating end 7*b* thereof, whereby the accumulator 1 is constructed as an outer gas type accumulator in which the gas chamber 10 is arranged in an outer peripheral side of the bellows 7 and the liquid chamber 11 is arranged in an inner peripheral side of the bellows 7. Further, a damping ring 9 is attached to an outer peripheral portion of the floating end 7*b*, for preventing the bellows 7 and the bellows cap 8 from coming into contact with the inner surface of the housing 2.

Annular first and second step portions 4*b* and 4*c* are sequentially formed in an inner side of the port hole 5, that is, an inner surface (a top surface in the drawing) of the oil port 4 so as to be positioned at an inner peripheral side of an annular stopper projection (seat surface) 4*a*, and a seal 13 is fitted and attached to the first step portion 4*b* and is held by a seal holder 14 fitted and attached to the second step portion 4*c* so as to be prevented from coming off. The seal 13 is structured such as to close the liquid chamber 11 (a space between the bellows 7 and the seal 13) at a time of zero-down of the accumulator 1 so as to seal a part of liquid in the liquid chamber 11, and is formed by a rubber-like elastic body packing provided with an outward seal lip in such a manner as to sufficiently achieve this function. In this case, the seal 13 may employ an O-ring, an X-ring or the like as far as a sufficient sealing performance can be obtained, and the present invention does not particularly limit a shape of the seal 13.

Further, the accumulator 1 is provided with a pressure difference regulating mechanism 21 reducing a pressure difference generated when each of the liquid sealed in the liquid chamber 11 and the charged gas thermally expands at a time of the zero-down.

The pressure difference regulating mechanism 21 has a movable plate 22 supported by a spring means 31, at the bellows cap 8 side of the oil port 4, in addition to the bellows 7 and the bellows cap 8. The spring means 31 is constructed by the coil spring in the first and second embodiments mentioned above, however, is constructed by a leaf spring in the third embodiment, that is, constructed by a thin disc 32 of which a flat shape is shown in FIG. 8.

The thin disc 32 in FIG. 8 is made of a leaf spring material such as a thin metal or the like, and is structured by concentrically arranging an annular outer peripheral attaching portion 32*b* at an outer peripheral side of an annular inner peripheral attaching portion 32*a*, and integrally forming both the attaching portions 32*a* and 32*b* via a plurality of (in the drawing, three uniformly arranged) leaf spring portions 32*c* circumferentially arranged. Each of the leaf spring portions 32*c* is formed in a planar circular arc shape which is longer in a circumferential direction so as to set an elastic deforming amount in an axial direction large, and is coupled to the inner peripheral attaching portion 32*a* by one end portion in the circumferential direction while being coupled to the outer peripheral attaching portion 32*b* by the other end portion in the circumferential direction. The inner peripheral attaching portion 32*a* is provided with a plurality of (in the drawing, three uniformly arranged) hole portions 32*d* for attaching purpose. Further, at a time of attaching, the inner peripheral attaching portion 32*a* is attached to an upper face of the movable plate 22 by means of welding, caulking, screwing, adhesive bonding or the like, and the outer peripheral attaching portion 32*b* is attached to a top end portion of a tubular attaching portion 4*d* provided on an outer peripheral portion of a stopper projection 4*a* of the oil port 4 by means of welding, caulking, screwing, adhesive bonding or the like similarly. Accordingly, the movable plate 22 is held by the oil port 4 via the thin disc 32. Further, since a gap in a radial direction is set between the movable plate 22 and the tubular attaching portion 4*d*, and a gap in a radial direction is set at positions other than those of the leaf spring portions 32*c* between the inner peripheral attaching portion 32*a* and the outer peripheral attaching portion 32*b* in the thin disc 32, there is provided a communication path 33 for communicating between a space (hereinafter, refer to as a bellows inner peripheral space) 11*a* surrounded by the bellows 7, the oil port 4, the thin disc 32, the movable plate 22 and the bellows cap 8, and the port hole 5 at the stationary operating time, by the gaps in a radial direction. In this case, the tubular attaching portion 4*d* may be manufactured independently from the oil port 4 so as to be post-attached, similarly to the stopper 24 in the first embodiment mentioned above.

The movable plate 22 is constructed by a disc made of a rigid material such as a metal or the like, and is arranged so as to allow free stroke in an axial direction (a vertical direction in the drawing) in such a manner as to come into contact with and away from the seal 13. The stroke is achieved while elastically deforming the thin disc 32 serving as the spring means 31. One end limit (a lower end limit) of the stroke is defined by the movable plate 22 coming into contact with the stopper projection 4*a*. Since a lip end of the seal 13 somewhat protrudes from the level of the stopper projection 4*a*, the movable plate 22 has been already in contact with the seal 13 at a time point when the movable plate 22 comes into contact with the stopper projection 4*a*. Further, since the inside higher step-shaped convex portion 22*b* protruding toward the bellows cap 8 side from the level of the thin disc 32 is provided in the center of the upper face of the movable plate 22, the convex portion 22*b* is pressed by the bellows cap 8.

The movable plate 22 is supported by the thin disc 32 serving as the spring means 31, and stays away from the stopper projection 4*a* and the seal 13 at the stationary operating time. At this time, the thin disc 32 serving as the spring means 31 is in a free state in which it is not elastically deformed. Further, when the bellows cap 8 comes down from the above, the movable plate 22 is pushed by the bellows cap 8 so as to come down, comes into contact with the stopper projection 4*a* so as to stop, and comes into contact with the seal 13 at this time.

Since the fixed end 7*a* of the bellows 7 is fixed to the inner surface of the flange portion of the oil port 4 corresponding to the inner surface at the port side of the housing 2, the accumulator 1 having the structure mentioned above belongs to the outer gas type category, and operates as follows on the basis of the structure mentioned above.

Stationary operating time:

FIG. 5 shows a state at the stationary operating time of the accumulator 1. The oil port 4 is connected to a pressure piping of an equipment (not shown). In this stationary state, since the movable plate 22 is supported by the thin disc 32 serving as the spring means 31 and stays away from the seal 13, the port hole 5 communicates with the bellows inner peripheral space 11*a* via the communication path 33. Accordingly, since liquid having occasional pressure is introduced from the port hole 5 to the bellows inner peripheral space 11*a*, the bellows cap 8 moves in such a manner that the liquid pressure balances with the gas pressure while expanding and contracting the bellows 7.

Zero-down time:

When the operation of the equipment stops from the state in FIG. 5, the liquid within the liquid chamber 11 is discharged little by little from the port hole 5, the bellows 7 is contracted little by little on the basis of the charged gas pressure in accordance with this, and the bellows cap 8 is moved little by little in the bellows contracting direction (a downward direction in the drawing). The moving bellows cap 8 presses the movable plate 22, and moves the movable plate 22, while elastically deforming the thin disc 32 serving as the spring means 31, so as to bring the movable plate 22 into contact with the seal 13. As shown in FIG. 6, the movable plate 22 stops by coming into contact with the stopper projection 4*a*. When the movable plate 22 comes into contact with the seal 13 and the stopper projection 4*a*, the liquid chamber (the space between the bellows 7 and the seal 13) 11 is closed and a part of the liquid is sealed in the liquid chamber 11. Accordingly, any further pressure reduction is not caused in the liquid chamber 11, whereby the liquid pressure balances with the gas pressure at the inner and outer sides of the bellows 7. Therefore, it is possible to suppress the abnormal deformation of the bellows 7 on the basis of the zero-down. In this case, since the movable plate 22 comes into contact with the seal 13 but the bellows cap 8 does not come into contact with the seal 13 at the zero-down time, the pressure receiving area of the bellows cap 8 is not limited by the seal 13 as is different from the conventional art mentioned above. Accordingly, the pressure receiving area of the bellows cap 8 is set equally between one surface at the gas chamber 10 side and the opposite surface at the liquid chamber 11 side.

Thermally expanding time in zero-down state:

When each of the liquid sealed in the liquid chamber 11 and the charged gas is thermally expanded on the basis of ambient air temperature rise or the like in the zero-down state in FIG. 6, that is, in the state in which the movable plate 22 comes into contact with the seal 13 and the stopper projection 4*a*, a pressure difference is generated since a rising rate of the pressure is higher in the liquid than in the gas. However, since the pressure receiving area of the bellows cap 8 is set equally between the gas chamber 10 side and the liquid chamber 11 side in the accumulator 1, the bellows cap 8 immediately starts moving in a direction that the bellows cap 8 stays away from the movable plate 22 (an upward direction in the drawing) as shown in FIG. 7, when the pressure difference is generated, and stops at a position at which the liquid pressure balances with the gas pressure. Accordingly, since it is possible to inhibit a great pressure difference from being generated between the inner and outer sides of the bellows 7, it is possible to prevent the abnormal deformation from being caused in the bellows 7 on the basis of the pressure difference. At this time, since the movable plate 22 keeps being in contact with the seal 13 as illustrated on the basis of the difference of the pressure receiving area between both the upper and lower faces, the zero-down state is not dissolved.

Therefore, in accordance with the accumulator 1 mentioned above, since it is possible to reduced the pressure difference generated when each of the liquid sealed in the liquid chamber 11 and the charged gas is thermally expanded at the zero-down time, in the outer gas type accumulator, it is possible to reduce the pressure difference between the inner and outer sides of the bellows 7, and it is possible to prevent the abnormal deformation from being caused in the bellows 7. Therefore, it is possible to improve durability of the bellows 7 and, consequently, that of the accumulator 1.

In this case, in the zero-down state in FIG. 6, the bellows cap 8 and the movable plate 22 come into contact with each other, however, it is preferable to apply the liquid pressure as quick as possible to the lower surface of the bellows cap 8, at the expanding time of the liquid and the charged gas. Accordingly, it is preferable that a spacer portion such as a step, a projection or the like is provided on a lower surface of the bellows cap 8 or an upper surface of the movable plate 22 in such a manner that the pressure quickly reaches a portion between the both 8 and 22, and the convex portion 22*b* mentioned above serves as the spacer portion as mentioned above.

Further, while the convex portion 22*b* in the planar circular shape is provided at the center of the upper surface of the movable plate 22 as mentioned above, a hole portion 32*e* in a planar circular shape is provided at the center of a flat surface of the thin disc 32 as shown in FIG. 8, and the hole portion 32*e* is engaged with the convex portion 22*b*. Owing to the structure in which the hole portion 32*e* is engaged with the convex portion 22*b* as mentioned above, it is possible to easily position the movable plate 22 and the thin disc 32, and it is possible to make a work for bonding the both 22 and 32 easy.

Further, since the thin disc 32 has a function of blocking a radial movement of the movable plate 22, the operation is smoothened.

Figure 9:
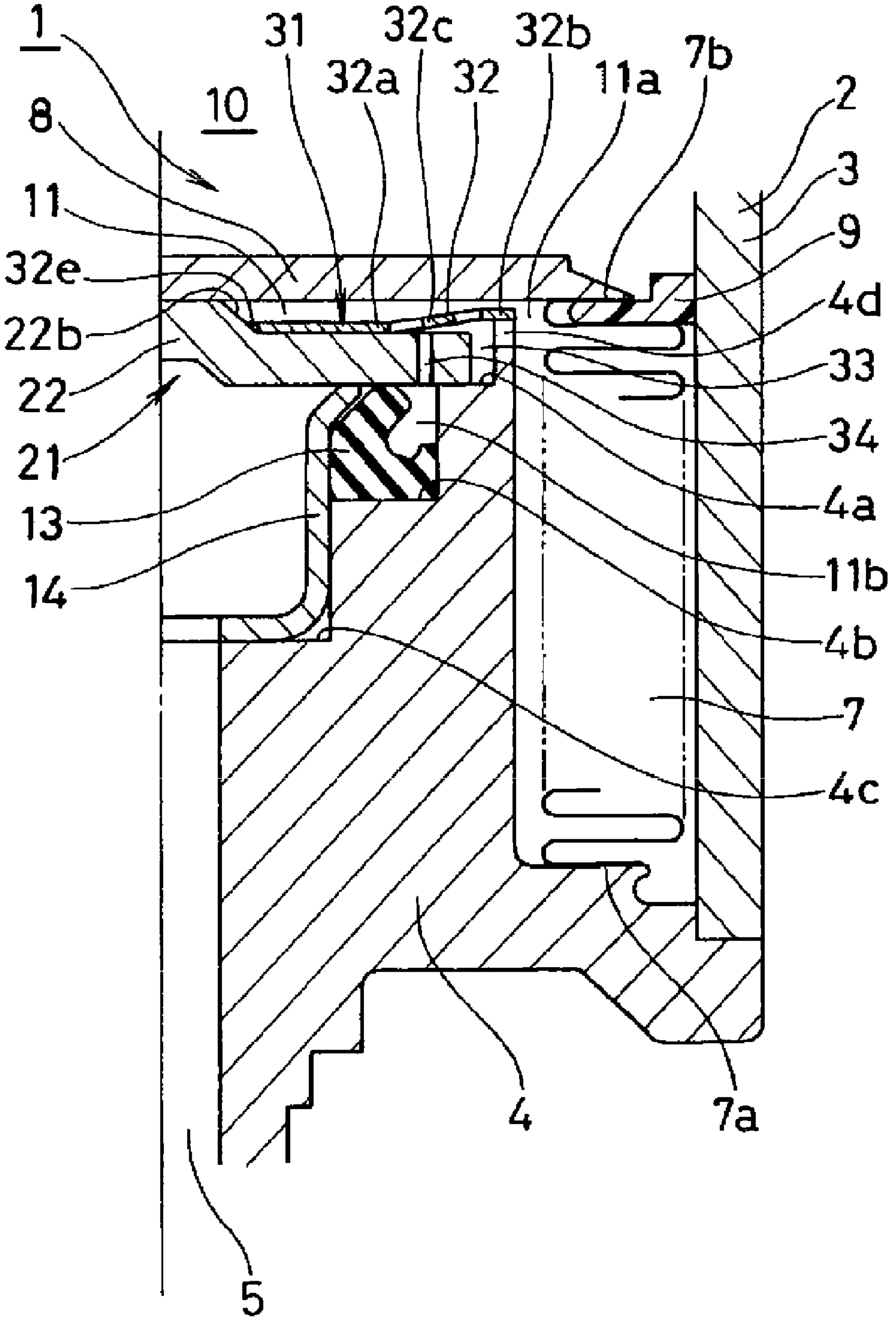
FIG. 9 is a substantial part sectional view showing a modified embodiment of a movable plate in the accumulator.
Figure 10:
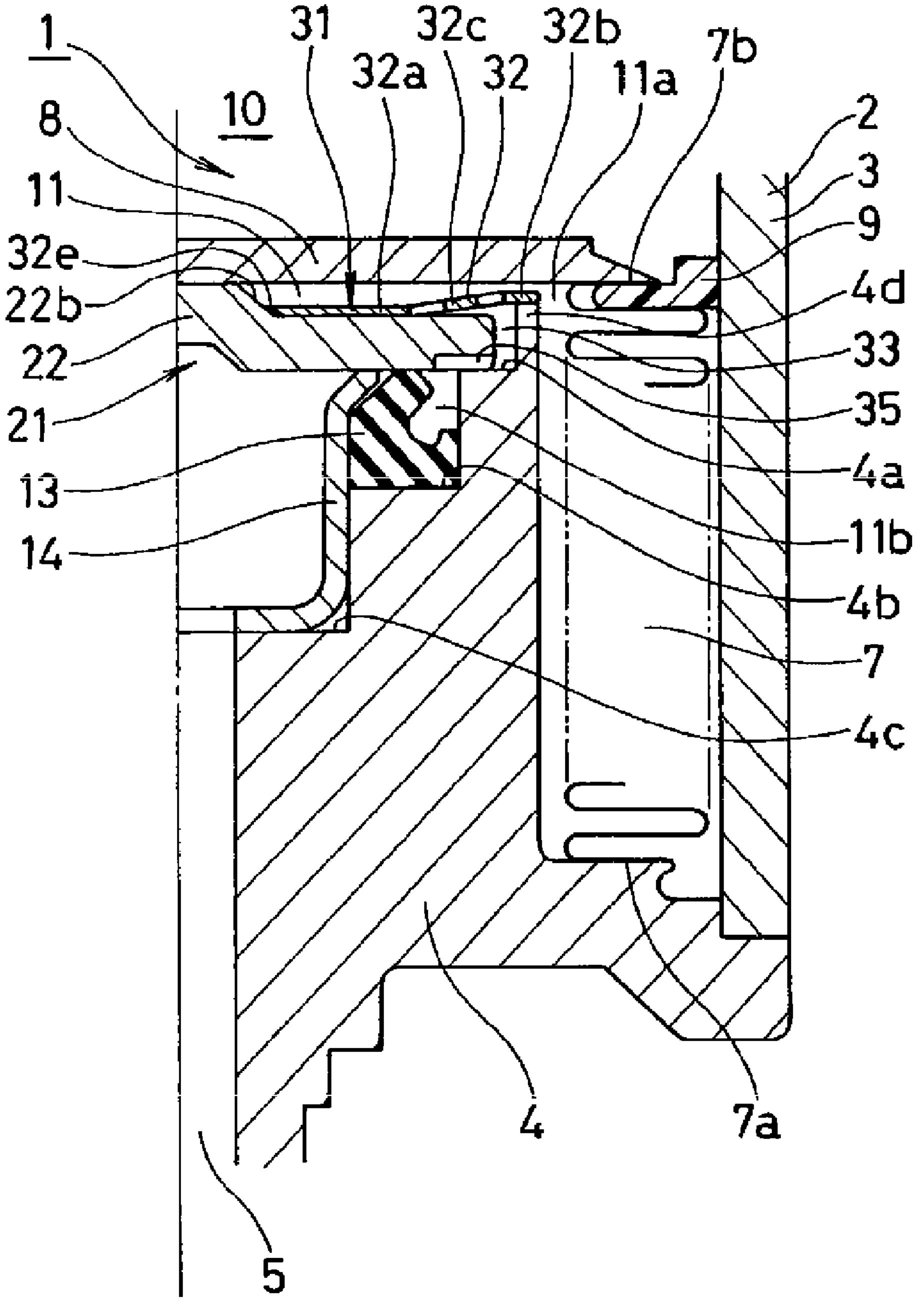
FIG. 10 is a substantial part sectional view showing a modified embodiment of a movable plate in the accumulator.

Further, the space 11*b* surrounded by the stopper projection 4*a*, the seal 13 and the movable plate 22 is sealed in the zero-down state in FIG. 6, however, if the space 11*b* communicates with the bellows inner peripheral space 11*a*, it is possible to suppress the high pressure caused by the thermal expansion of the liquid in the former space 11*b*, whereby it is possible to prevent the seal 13 from being damaged by the high pressure. Accordingly, in order to make a communication between both the spaces 11*a* and 11*b* from this point of view, it is preferable that a through hole shaped communication path 34 is provided in the movable plate 22 as shown in FIG. 9, or a notch shaped communication path 35 is provided in an outer peripheral portion of the movable plate 22 as shown in FIG. 10.

Fourth Embodiment

Figure 11:
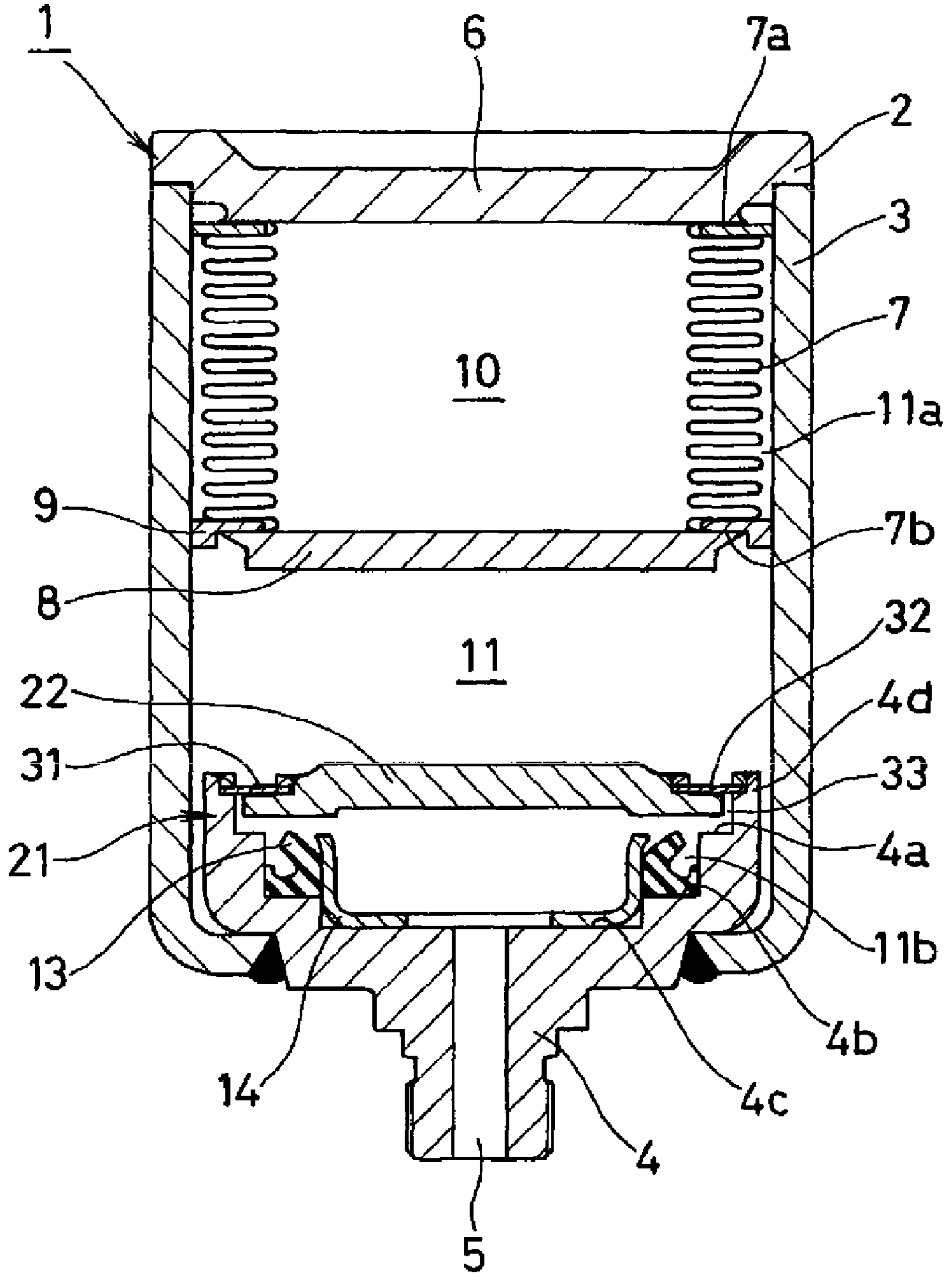
FIG. 11 is a whole sectional view showing a state at a stationary operating time of an accumulator in accordance with a fourth embodiment of the present invention.

The accumulator 1 in accordance with the third embodiment mentioned above is the outer gas type accumulator, however, the pressure difference regulating mechanism 21 can be applied to an inner gas type accumulator. FIG. 11 shows an embodiment thereof, and a fixed end 7*a* of a bellows 7, in which a bellows cap 8 is attached to a floating end 7*b*, is fixed to an end cover 6 in an upper portion of a housing 2, whereby the inner gas type accumulator 1 is constructed so that an inner peripheral side of the bellows 7 is set to a gas chamber 10, and an outer peripheral side thereof is set to a liquid chamber 11. Since the structure and the operation of the pressure difference regulating mechanism 21 are the same as those of the third embodiment, a description thereof will be omitted by attaching the same reference numerals. However, as a different point, a planar shape of the thin disc 32 is set to be identical to a planar shape of a thin disc 32 in accordance with the following fifth embodiment.

Fifth Embodiment

Figure 12:
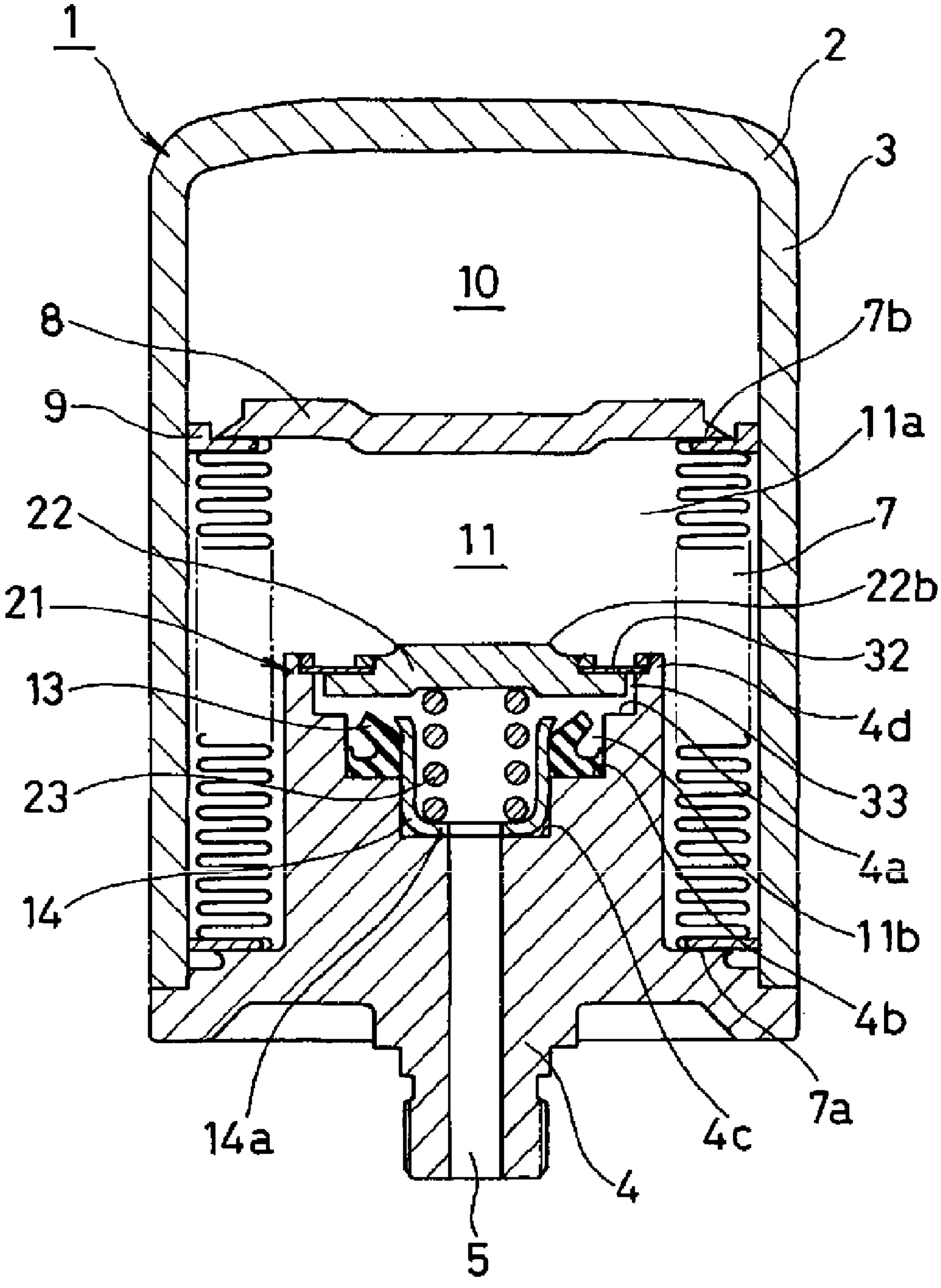
FIG. 12 is a whole sectional view showing a state at a stationary operating time of an accumulator in accordance with a fifth embodiment of the present invention.
Figure 13:
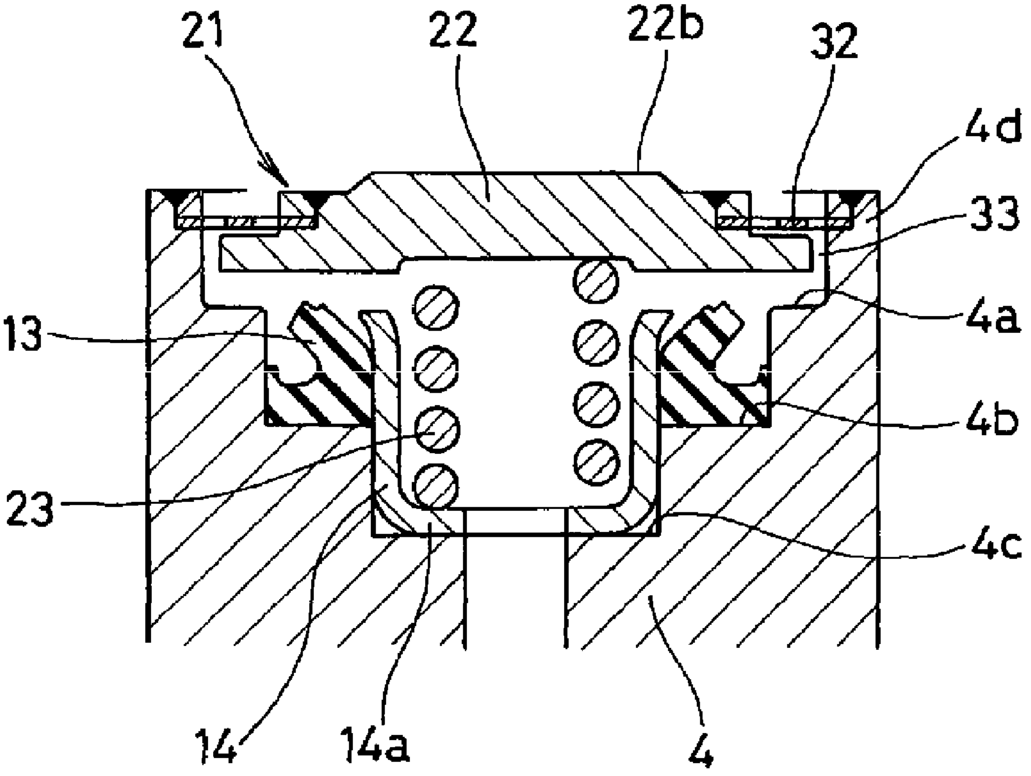
FIG. 13 is a substantial part enlarged view of FIG. 12.
Figure 14:
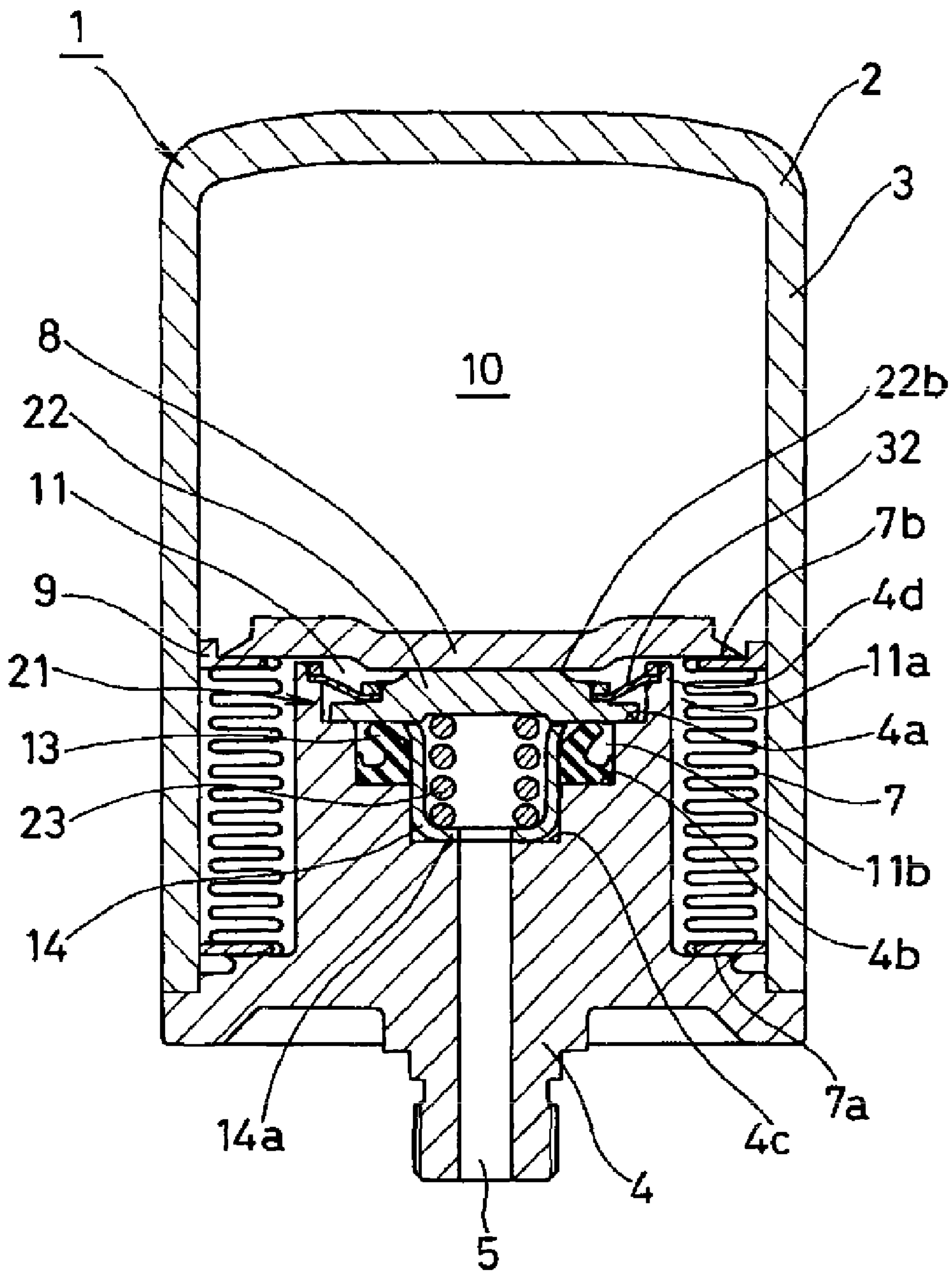
FIG. 14 is a whole sectional view showing a state at a time of zero-down of the accumulator.
Figure 15:
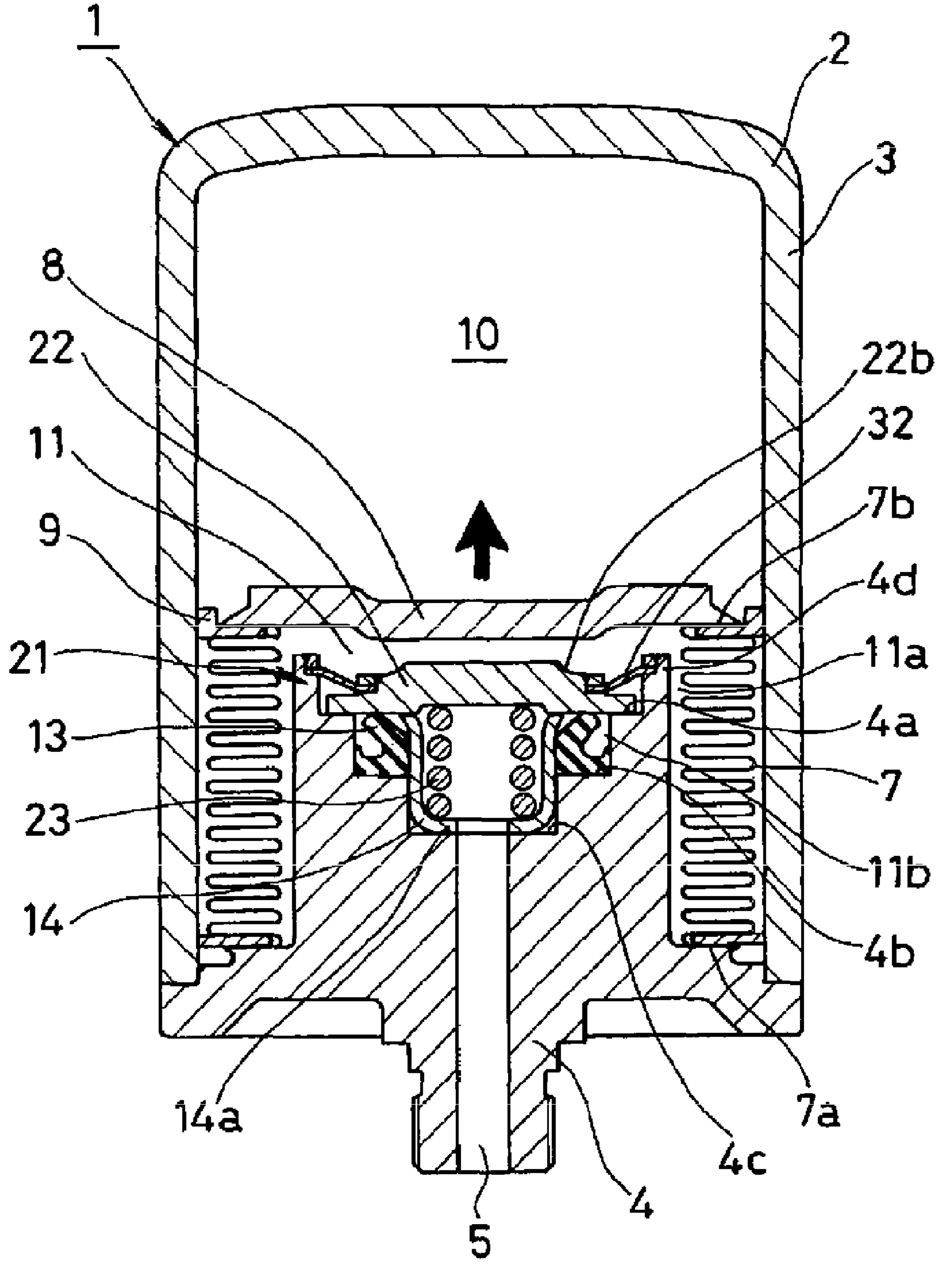
FIG. 15 is a whole sectional view showing a state at a thermal expanding time in the zero-down state of the accumulator.
Figure 16:
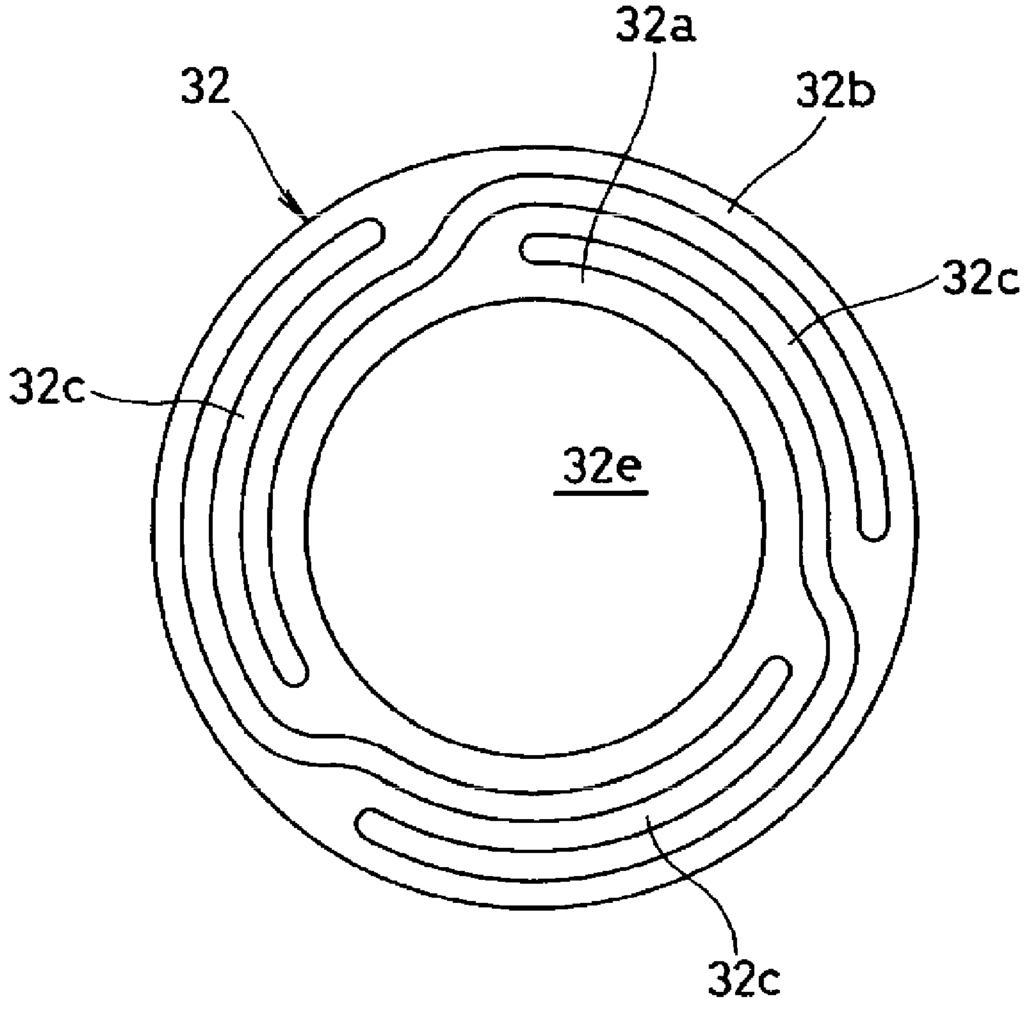
FIG. 16 is a plan view of a leaf spring (a thin disc) in the accumulator.

FIGS. 12 to 15 show a whole section and a partial section of an accumulator 1 in accordance with a fifth embodiment of the present invention. FIG. 12 show a state at a stationary operating time, FIG. 13 shows an enlarged substantial part thereof, FIG. 14 shows a state at a zero-down time, and FIG. 15 shows a state at a thermally expanding time in the zero-down state, respectively. Further, FIG. 16 is a plan view of a leaf spring (a thin disc) 32 serving as one of the spring means.

The accumulator 1 in accordance with the embodiment is a metal bellows type accumulator using a metal bellows as a bellows 7, and is constructed as follows.

First of all, there is provided an accumulator housing 2 having an oil port 4 connected to a pressure piping (not shown), a bellows 7 is arranged in an inner portion of the housing 2, and an internal space of the housing 2 is comparted into a gas chamber 10 in which high pressure gas is charged, and a liquid chamber 11 which communicates with a port hole 5 of the oil port 4. As the housing 2, there is drawn a housing constructed by a combination of a closed-end cylindrical shell 3, and the oil port 4 fixed to one end opening portion of the shell 3, however, a component combining structure of the housing 2 is not limited particularly. For example, the shell 3 and the oil port 4 may be integrated, a bottom portion of the shell 3 may be constructed by an end cover which is an independent body from the shell 3, and in any case, a gas injection port (not shown) for injecting gas into the gas chamber 10 is provided in the bottom portion of the shell 3 or a corresponding part thereto.

The bellows 7 is structured such that a fixed end 7*a* thereof is fixed to an inner surface of a flange portion of the oil port 4 corresponding to a port side inner surface of the housing 2 and a disc-shaped bellows cap 8 is fixed to a floating end 7*b* thereof, whereby the accumulator 1 is constructed as an outer gas type accumulator in which the gas chamber 10 is arranged in an outer peripheral side of the bellows 7 and the liquid chamber 11 is arranged in an inner peripheral side of the bellows 7. Further, a damping ring 9 is attached to an outer peripheral portion of the floating end 7*b*, for preventing the bellows 7 and the bellows cap 8 from coming into contact with the inner surface of the housing 2.

Annular first and second step portions 4*b* and 4*c* are sequentially formed in an inner side of the port hole 5, that is, an inner surface (a top surface in the drawing) of the oil port 4 so as to be positioned at an inner peripheral side of an annular stopper projection (seat surface) 4*a*, and a seal 13 is fitted and attached to the first step portion 4*b* and is held by a seal holder 14 fitted and attached to the second step portion 4*c* so as to be prevented from coming off. The seal 13 is structured such as to close the liquid chamber 11 (a space between the bellows 7 and the seal 13) at a time of zero-down of the accumulator 1 so as to seal a part of liquid in the liquid chamber 11, and is formed by a rubber-like elastic body packing provided with an outward seal lip in such a manner as to sufficiently achieve this function. In this case, the seal 13 may employ an O-ring, an X-ring or the like as far as a sufficient sealin performance can be obtained, and the present invention does not particularly limit a shape of the seal 13.

Further, the accumulator 1 is provided with a pressure difference regulating mechanism 21 reducing a pressure difference generated when each of the liquid sealed in the liquid chamber 11 and the charged gas thermally expands at a time of the zero-down.

The pressure difference regulating mechanism 21 has a movable plate 22 supported by a spring means, at the bellows cap 8 side of the oil port 4, in addition to the bellows 7 and the bellows cap 8. The spring means is constructed by a single component of the coil spring in the first and second embodiments mentioned above, and by a single component of the leaf spring (the thin disc) in the third and fourth embodiments, however, both of the coil spring 23 and the leaf spring (the thin disc) 32 are used in the fifth embodiment.

The coil spring 23 is interposed between a spring retainer 14*a* and the movable plate 22 where a lower end flange portion of the seal holder 14 is set as the spring retainer 14*a*, and elastically energizes the movable plate 22 in a direction of staying away from the seal 13 (an upward direction in the drawing). However, since a function of the coil spring 23 is to move the movable plate 22 away from the seal 13 at the stationary operating time, it is not necessary to energize the movable plate 22 when the movable plate 22 is positioned at a neutral position of the leaf spring (the thin disc) 32, and it is sufficient to support the movable plate 22.

On the other hand, the leaf spring (the thin disc) 32 is made of a leaf spring material such as a thin metal or the like as shown in FIG. 16, and is structured by concentrically arranging an annular outer peripheral attaching portion 32*b* at an outer peripheral side of an annular inner peripheral attaching portion 32*a*, and integrally forming both the attaching portions 32*a* and 32*b* via a plurality of (in the drawing, three uniformly arranged) leaf spring portions 32*c* circumferentially arranged. Each of the leaf spring portions 32*c* is formed in a planar circular arc shape which is longer in a circumferential direction so as to set an elastic deforming amount in an axial direction large, and is coupled to the inner peripheral attaching portion 32*a* by one end portion in the circumferential direction while being coupled to the outer peripheral attaching portion 32*b* by the other end portion in the circumferential direction. Further, at a time of attaching, the inner peripheral attaching portion 32*a* is attached to an upper face of the movable plate 22 by means of welding, caulking, screwing, adhesive bonding or the like, and the outer peripheral attaching portion 32*b* is attached to a top end portion of a tubular attaching portion 4*d* provided on an outer peripheral portion of a stopper projection 4*a* of the oil port 4 by means of welding, caulking, screwing, adhesive bonding or the like similarly. Accordingly, the movable plate 22 is held by the oil port 4 via the leaf spring (the thin disc) 32. Further, since a gap in a radial direction is set between the movable plate 22 and the tubular attaching portion 4*d*, and a gap in a radial direction is set at positions other than those of the leaf spring portions 32*c* between the inner peripheral attaching portion 32*a* and the outer peripheral attaching portion 32*b* in the leaf spring (the thin disc) 32, there is provided a communication path 33 for communicating between a space (hereinafter, refer to as a bellows inner peripheral space) 11*a* surrounded by the bellows 7, the oil port 4, the leaf spring (the thin disc) 32, the movable plate 22 and the bellows cap 8, and the port hole 5 at the stationary operating time, by the gaps in a radial direction. In this case, the tubular attaching portion 4*d* may be manufactured independently from the oil port 4 so as to be post-attached, similarly to the stopper 24 in the first embodiment mentioned above.

The movable plate 22 is constructed by a disc made of a rigid material such as a metal or the like, and is arranged so as to allow free stroke in an axial direction (a vertical direction in the drawing) in such a manner as to come into contact with and away from the seal 13. The stroke is achieved while elastically deforming the coil spring 23 and the leaf spring (thin disc) 32 serving as the spring means. One end limit (a lower end limit) of the stroke is defined by the movable plate 22 coming into contact with the stopper projection 4*a*. Since a lip end of the seal 13 somewhat protrudes from the level of the stopper projection 4*a*, the movable plate 22 has been already in contact with the seal 13 at a time point when the movable plate 22 comes into contact with the stopper projection 4*a*. Further, since the inside higher step-shaped convex portion 22*b* protruding toward the bellows cap 8 side from the level of the thin disc 32 is provided in the center of the upper face of the movable plate 22, the convex portion 22*b* is pressed by the bellows cap 8.

The movable plate 22 is supported by the coil spring 23 and the leaf spring (the thin disc) 32 serving as the spring means, and stays away from the stopper projection 4*a* and the seal 13 at the stationary operating time. At this time, the leaf spring (the thin disc) 32 corresponding to one of the spring means is in a free state in which it is not elastically deformed. Further, when the bellows cap 8 comes down from the above, the movable plate 22 is pushed by the bellows cap 8 so as to come down, comes into contact with the stopper projection 4*a* so as to stop, and comes into contact with the seal 13 at this time.

Since the fixed end 7*a* of the bellows 7 is fixed to the inner surface of the flange portion of the oil port 4 corresponding to the inner surface at the port side of the housing 2, the accumulator 1 having the structure mentioned above belongs to the outer gas type category, and operates as follows on the basis of the structure mentioned above.

Stationary operating time:

FIGS. 12 and 13 show a state at the stationary operating time of the accumulator 1. The oil port 4 is connected to a pressure piping of an equipment (not shown). In this stationary state, since the movable plate 22 is supported by the coil spring 23 and the leaf spring (the thin disc) 32 serving as the spring means and stays away from the seal 13, the port hole 5 communicates with the bellows inner peripheral space 11*a* via the communication path 33. Accordingly, since liquid having occasional pressure is introduced from the port hole 5 to the bellows inner peripheral space 11*a*, the bellows cap 8 moves in such a manner that the liquid pressure balances with the gas pressure while expanding and contracting the bellows 7.

Zero-down time:

When the operation of the equipment stops from the state in FIGS. 12 and 13, the liquid within the liquid chamber 11 is discharged little by little from the port hole 5, the bellows 7 is contracted little by little on the basis of the charged gas pressure in accordance with this, and the bellows cap 8 is moved little by little in the bellows contracting direction (a downward direction in the drawing). The moving bellows cap 8 presses the movable plate 22, and moves the movable plate 22, while elastically deforming the coil spring 23 and the leaf spring (the thin disc) 32 serving as the spring means, so as to bring the movable plate 22 into contact with the seal 13. As shown in FIG. 14, the movable plate 22 stops by coming into contact with the stopper projection 4*a*. When the movable plate 22 comes into contact with the seal 13 and the stopper projection 4*a*, the liquid chamber (the space between the bellows 7 and the seal 13) 11 is closed and a part of liquid is sealed in the liquid chamber 11. Accordingly, any further pressure reduction is not caused in the liquid chamber 11, whereby the liquid pressure is balanced with the gas pressure at the inner and outer sides of the bellows 7. Therefore, it is possible to suppress the abnormal deformation of the bellows 7 on the basis of the zero-down. In this case, since the movable plate 22 comes into contact with the seal 13 but the bellows cap 8 does not come into contact with the seal 13 at the zero-down time, the pressure receiving area of the bellows cap 8 is not limited by the seal 13 as is different from the conventional art mentioned above. Accordingly, the pressure receiving area of the bellows cap 8 is set equally between one surface at the gas chamber 10 side and the opposite surface at the liquid chamber 11 side.

Thermally expanding time in zero-down state:

When each of the liquid sealed in the liquid chamber 11 and the charged gas is thermally expanded on the basis of ambient air temperature rise or the like in the zero-down state in FIG. 14, that is, in the state in which the movable plate 22 comes into contact with the seal 13 and the stopper projection 4*a*, a pressure difference is generated since a rising rate of the pressure is higher in the liquid than in the gas. However, since the pressure receiving area of the bellows cap 8 is set equally between the gas chamber 10 side and the liquid chamber 11 side in the accumulator 1, the bellows cap 8 immediately starts moving in a direction that the bellows cap 8 stays away from the movable plate 22 (an upward direction in the drawing) as shown in FIG. 15, when the pressure difference is generated, and stops at a position at which the liquid pressure balances with the gas pressure. Accordingly, since it is possible to inhibit a great pressure difference from being generated between the inner and outer sides of the bellows 7, it is possible to prevent the abnormal deformation from being caused in the bellows 7 on the basis of the pressure difference. At this time, since the movable plate 22 keeps being in contact with the seal 13 as illustrated on the basis of the difference of the pressure receiving area between both the upper and lower faces, the zero-down state is not dissolved.

Therefore, in accordance with the accumulator 1 mentioned above, since it is possible to reduced the pressure difference generated when each of the liquid sealed in the liquid chamber 11 and the charged gas is thermally expanded at the zero-down time, in the outer gas type accumulator, it is possible to reduce the pressure difference between the inner and outer sides of the bellows 7, and it is possible to prevent the abnormal deformation from being caused in the bellows 7. Therefore, it is possible to improve a durability of the bellows 7 and, consequently, that of the accumulator 1.

In this case, in the zero-down state in FIG. 14, the bellows cap 8 and the movable plate 22 come into contact with each other, however, it is preferable to apply the liquid pressure as quick as possible to the lower surface of the bellows cap 8, at the expanding time of the liquid and the charged gas. Accordingly, it is preferable that a spacer portion such as a step, a projection or the like is provided on a lower surface of the bellows cap 8 or an upper surface of the movable plate 22 in such a manner that the pressure quickly reaches a portion between the both 8 and 22, and the convex portion 22*b* mentioned above serves as the spacer portion as mentioned above.

Further, while the convex portion 22*b* in the planar circular shape is provided at the center of the upper surface of the movable plate 22 as mentioned above, a hole portion 32*e* in a planar circular shape is provided at the center of a flat surface of the leaf spring (the thin disc) 32 as shown in FIG. 16, and the hole portion 32*e* is engaged with the convex portion 22*b*. Owing to the structure in which the hole portion 32*e* is engaged with the convex portion 22*b* as mentioned above, it is possible to easily position the movable plate 22 and the leaf spring (the thin disc) 32, and it is possible to make a work for bonding the both 22 and 32 easy. Further, since the leaf spring (the thin disc) 32 has a function of blocking a radial movement of the movable plate 22, the operation is smoothened.

Further, the space 11*b* surrounded by the stopper projection 4*a*, the seal 13 and the movable plate 22 is sealed in the zero-down state in FIG. 14, however, if the space 11*b* communicates with the bellows inner peripheral space 11*a*, it is possible to suppress the high pressure caused by the thermal expansion of the liquid in the former space 11*b*, whereby it is possible to prevent the seal 13 from being damaged by the high pressure. Accordingly, in order to make a communication between both the spaces 11*a* and 11*b* from this point of view, it is preferable that a through hole shaped communication path is provided in the movable plate 22, or a notch shaped communication path 35 is provided in an outer peripheral portion of the movable plate 22.

Sixth Embodiment

Figure 17:
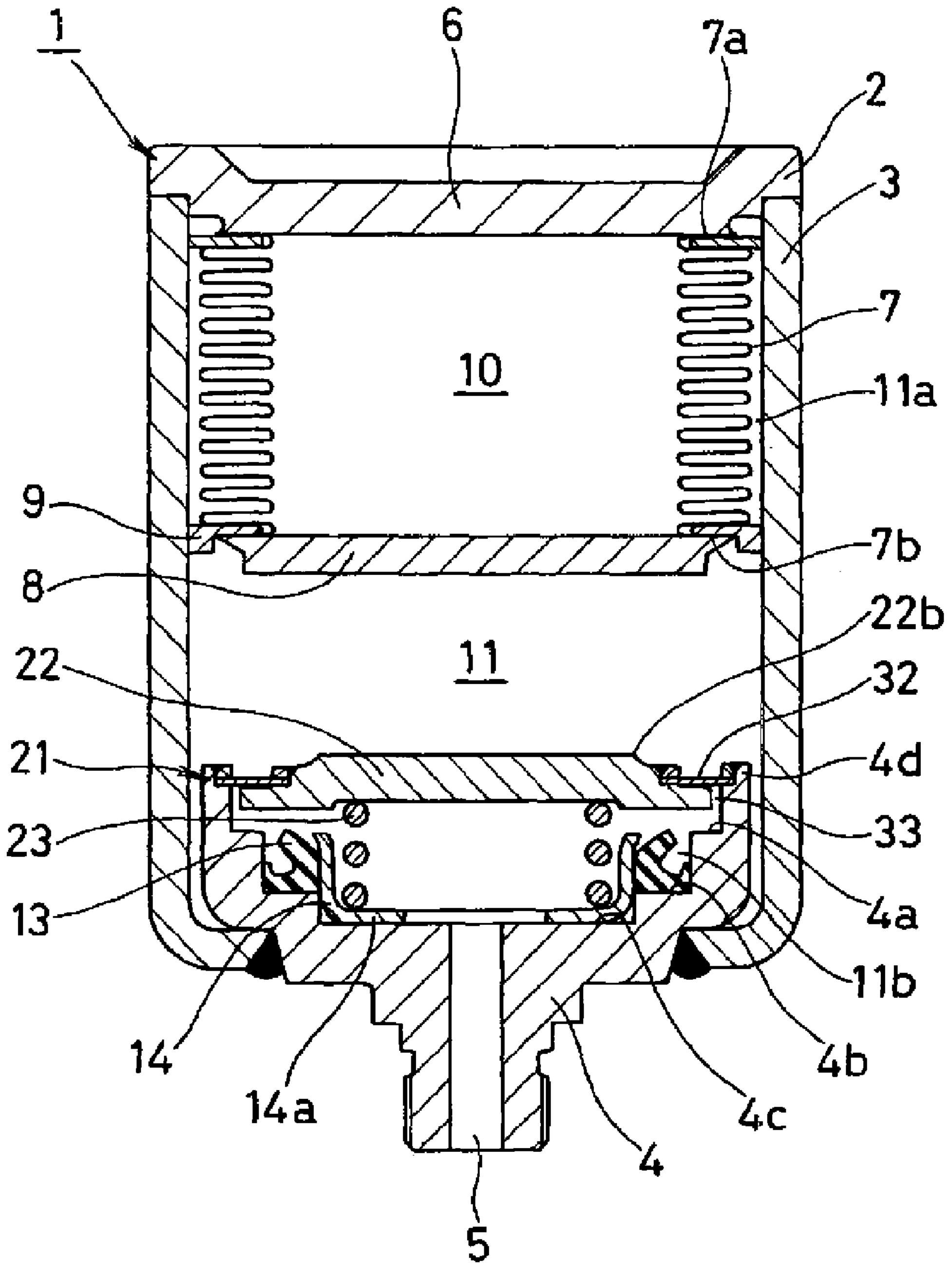
FIG. 17 is a whole sectional view showing a state at a stationary operating time of an accumulator in accordance with a sixth embodiment of the present invention.
Figure 18:
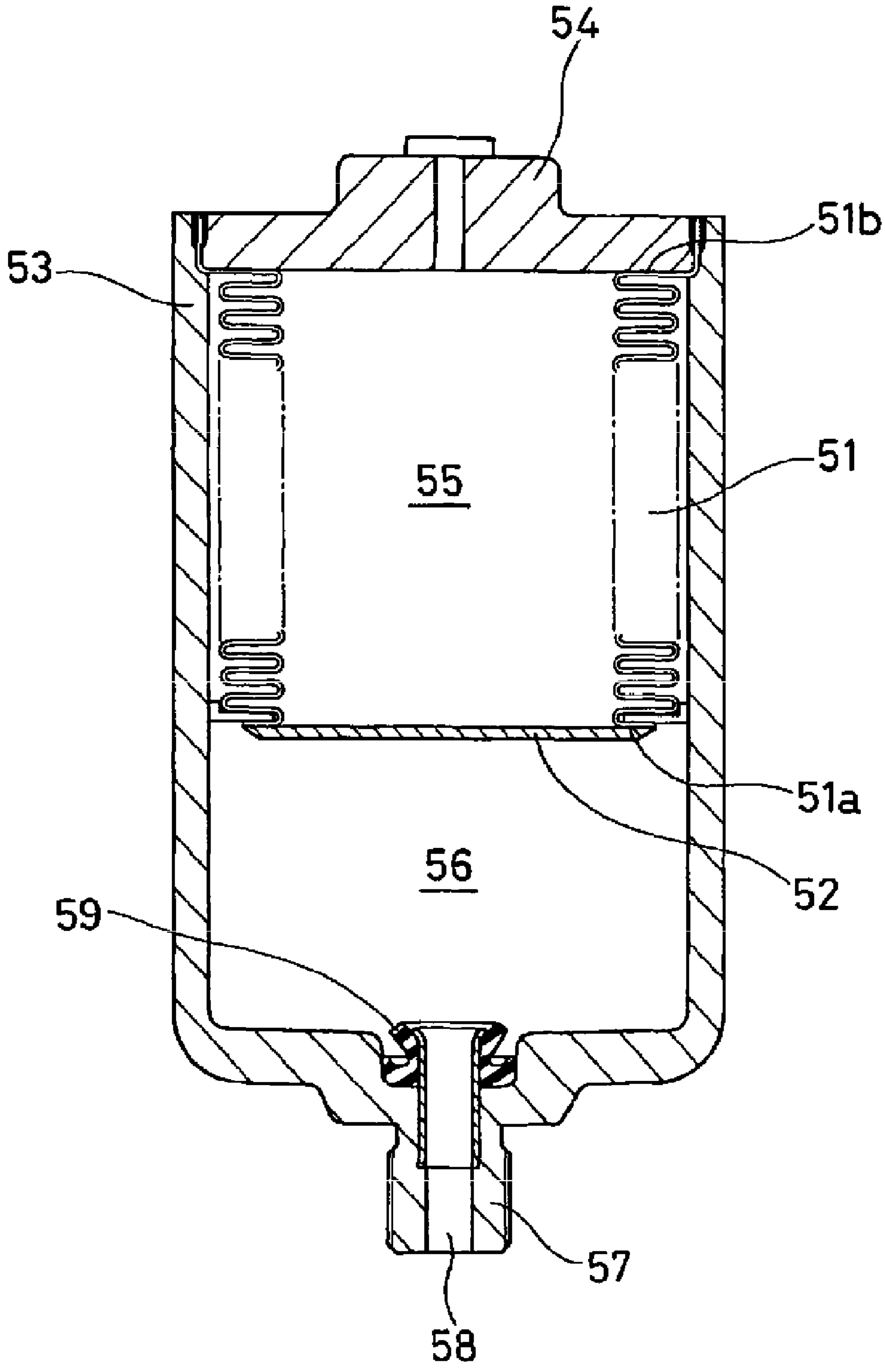
FIG. 18 is a sectional view of an accumulator in accordance with a conventional art.
Figure 19:
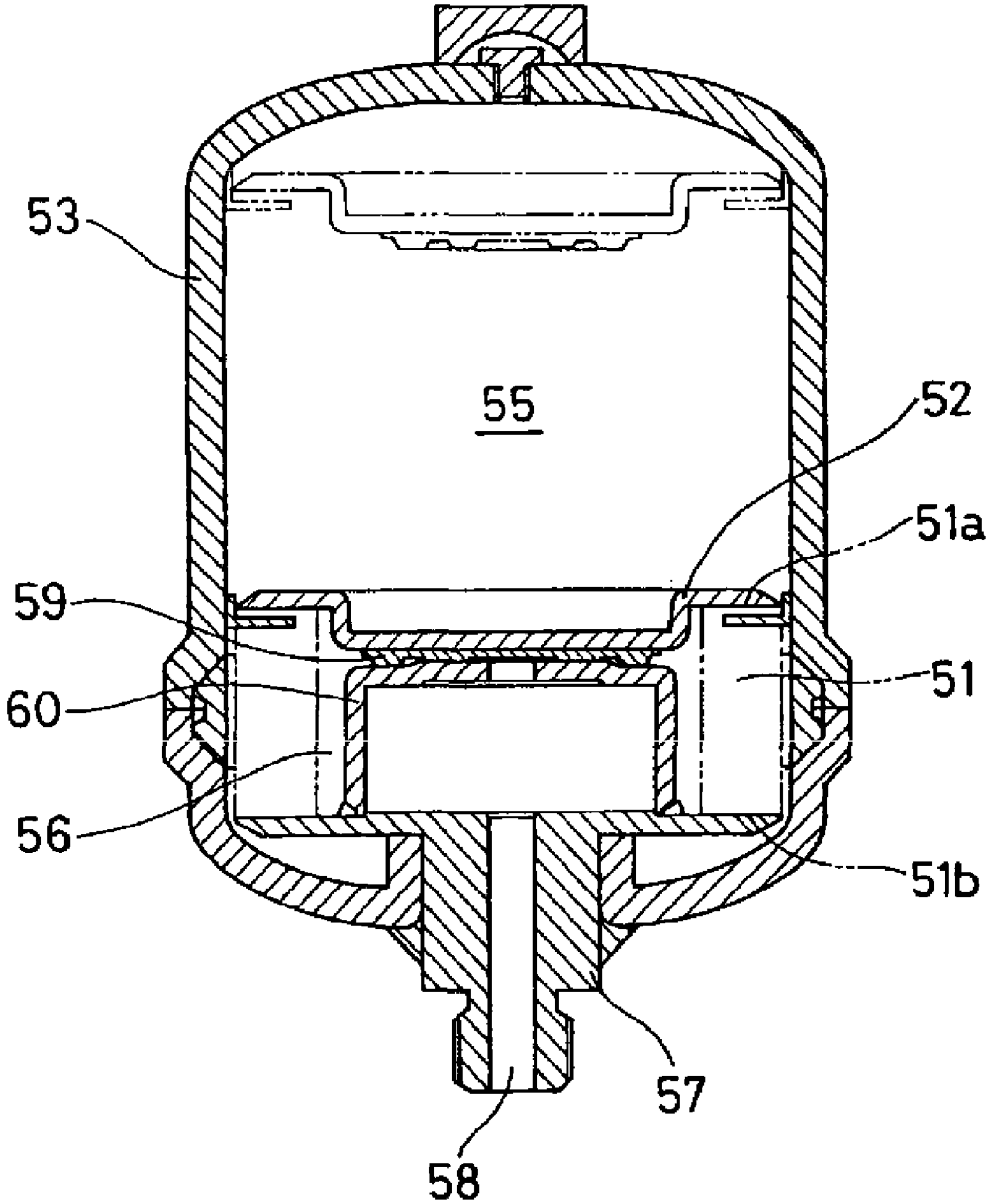
FIG. 19 is a sectional view of an accumulator in accordance with another conventional art.
Figure 20:
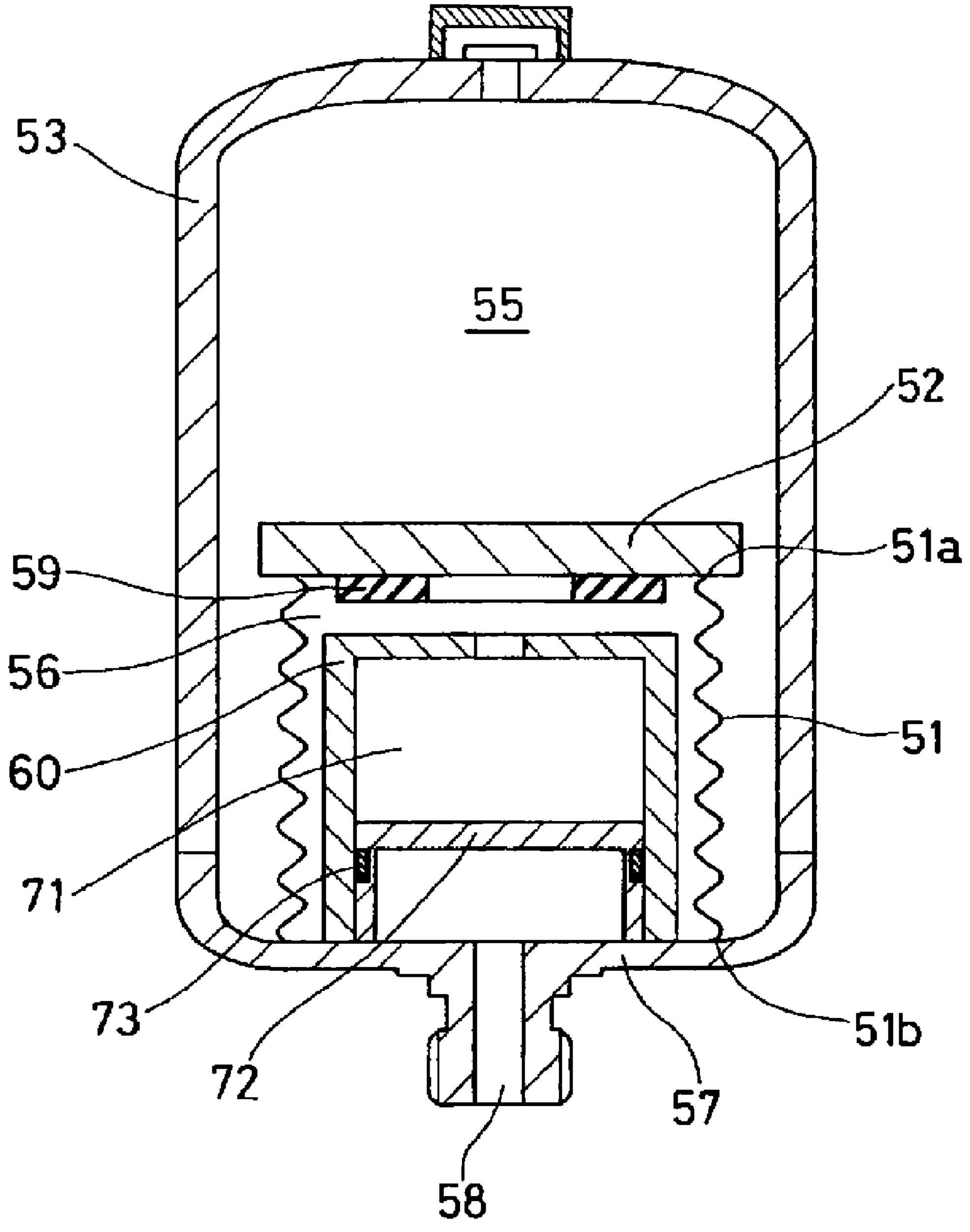
FIG. 20 is a sectional view of an accumulator in accordance with another conventional art.

The accumulator 1 in accordance with the fifth embodiment mentioned above is the outer gas type accumulator, however, the pressure difference regulating mechanism 21 can be applied to an inner gas type accumulator. FIG. 17 shows an embodiment thereof, and a fixed end 7*a* of a bellows 7, in which a bellows cap 8 is attached to a floating end 7*b*, is fixed to an end cover 6 in an upper portion of a housing 2, whereby the inner gas type accumulator 1 is constructed so that an inner peripheral side of the bellows 7 is set to a gas chamber 10, and an outer peripheral side thereof is set to a liquid chamber 11. Since the structure and the operation of the pressure difference regulating mechanism 21 are the same as those of the fifth embodiment, a description thereof will be omitted by attaching the same reference numerals.

What is claimed is:

1. An accumulator comprising:

an accumulator housing provided with an oil port connected to a pressure piping;

a bellows and a bellows cap arranged in an internal space of said housing and comparting said internal space into a gas chamber charging high pressure gas and a liquid chamber communicating with a port hole of said oil port; and a seal closing said liquid chamber at a time of zero-down so as to seal a part of liquid in said liquid chamber, the seal being provided in an inner side of said oil port, wherein a movable plate supported by a spring means is provided at the bellows cap side of said oil port, said movable plate is supported by said spring means so as to stay away from said seal at a time of a stationary operation, said movable plate is pushed by said bellows cap so as to come into contact with said seal while elastically deforming said spring means at a time of the zero-down, and said bellows cap moves to a position at which liquid pressure is balanced with gas pressure while said movable plate keeps in contact with said seal, when the liquid sealed in said liquid chamber and the charged gas thermally expand at a time of the zero-down.

2. An accumulator as claimed in claim 1, wherein the spring means is constructed by a coil spring, said coil spring is interposed between the oil port and the movable plate, and said oil port is provided with a stopper defining a maximum clearance of said movable plate.

3. An accumulator as claimed in claim 1, wherein the spring means is constructed by a leaf spring, and said leaf spring is arranged at an outer peripheral side of the movable plate, is fixed to the oil port by its one end portion, and is fixed to said movable plate by its other end portion.

4. An accumulator as claimed in claim 1, wherein the spring means is constructed by both a coil spring and a leaf spring, said coil spring is interposed between the oil port and the movable plate, and said leaf spring is arranged at an outer peripheral side of said movable plate, is fixed to said oil port by its one end portion, and is fixed to said movable plate by its other end portion.

* * * * *